US012748644B2

(12) United States Patent
Dotan-Cohen et al.

(10) Patent No.: US 12,748,644 B2
(45) Date of Patent: Sep. 29, 2026

(54) EFFICIENT GENERATION OF APPLICATION PROGRAMMING INTERFACE CALLS USING LANGUAGE MODELS, DATA TYPES, AND ENRICHED SCHEMA

(71) Applicant: MICROSOFT TECHNOLOGY LICENSING, LLC, Redmond, WA (US)

(72) Inventors: Dikla Dotan-Cohen, Netanya (IL); Kathleen O'Brien Nowak, Seattle, WA (US); Assaf Avihoo, Matan (IL); Tom Abramov, Herzliya (IL); Adar Vit, Hadera (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 434 days.

(21) Appl. No.: 18/404,677

(22) Filed: Jan. 4, 2024

(65) Prior Publication Data

US 2025/0225008 A1 Jul. 10, 2025

(51) Int. Cl.
*G06F 9/54* (2006.01)
*G06F 16/9032* (2019.01)

(52) U.S. Cl.
CPC ........ *G06F 9/547* (2013.01); *G06F 16/90324* (2019.01)

(58) Field of Classification Search
CPC ........................................................ G06F 9/54
See application file for complete search history.

(56) References Cited

U.S. PATENT DOCUMENTS

| | | | | |
|---|---|---|---|---|
| 10,157,234 | B1 | 12/2018 | Alagappan | |
| 12,321,795 | B1 * | 6/2025 | Stead | G06F 9/451 |
| 12,430,227 | B1 * | 9/2025 | Badam | G06F 9/547 |
| 12,597,421 | B1 * | 4/2026 | Kumar | G06F 9/547 |
| 2021/0192397 | A1 * | 6/2021 | Rastogi | G06Q 10/02 |
| 2024/0403289 | A1 * | 12/2024 | Hawes | G06F 16/2455 |
| 2025/0148290 | A1 * | 5/2025 | Vasseur | G06N 3/09 |

OTHER PUBLICATIONS

Extended European Search Report Received in European Patent Application No. 24222066.3, mailed on May 8, 2025, 10 pages.
Patil, et al., "Gorilla: Large Language Model Connected with Massive APIs", arXiv:2305.15334v1, May 24, 2023, 18 pages.

* cited by examiner

*Primary Examiner* — Kevin L Young
*Assistant Examiner* — Connor Imiola Blackburn

(57) ABSTRACT

Various embodiments of the technology described herein cause an LLM to intelligently process data based on a user query and a schema determined for a data set. Certain embodiments programmatically leverage an LLM and utilize its output based on a user query. In this manner, data is processed without the LLM having to access an entire data set, and instead only utilizes information associated with the user query and the schema. The schema comprises a textual description, such as a string of alphanumeric characters, that describes the data, data types, and/or data structure of the data set. Embodiments of the technology described herein are performed by an LLM interface layer separate from a user device layer and an LLM layer. The LLM interface layer is positioned between an LLM abstraction layer and an application layer by which a user can interface with the LLM interface layer.

20 Claims, 11 Drawing Sheets

EFFICIENT GENERATION OF APPLICATION PROGRAMMING INTERFACE CALLS USING LANGUAGE MODELS, DATA TYPES, AND ENRICHED SCHEMA

BACKGROUND

Computational linguistics, also known as Natural Language Processing (NLP), is a computer-based technique to understand, learn, and/or generate natural human language content. Recent advances in NLP technologies use sophisticated language models to derive a rich understanding of natural language. For example, some language models engage in generation of content, such as textual content, based on text inputs.

Natural Language Generation (NLG) is one of the crucial yet challenging sub-fields of NLP. NLG techniques are used by certain language models, such as large language models (LLMs), in many downstream tasks such as text summarization, dialogue generation, generative question answering (GQA), data-to-text generation, and machine translation. However, these and other models are prone to certain issues. First, certain language models, such as LLMs, cannot receive large data inputs or act on these inputs to format content in a particular way. Indeed, certain prompt input spaces are limited in the input size, making processing a large data set not possible. Second, certain language models are prone to "hallucination," which refers to the generation of text that is nonsensical, unfaithful to the provided source input, or is otherwise incorrect. Hallucinations may increase as the input to the LLM increases. Hallucination is concerning because it hinders model performance, such as accuracy, especially when the desired output is complicated or includes a multimodal output, including text, graphics, or visual content.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the technology described herein programmatically expand the capabilities of computing systems by enabling Large Language Models (LLMs) to process data sets, such as very large data inputs. In particular, such data sets would otherwise not be possible or practical to process by an LLM due to LLM data input constraints or the high level of computational resources required. Further embodiments of the technology also expand the functionality of computing systems by enabling LLMs to be utilized for providing visual outputs of the data sets including processed or interpreted data based on the data sets. Aspects of this technology are performed by an LLM interface layer between a client interface layer and an LLM layer, leaving an existing LLM unmodified in one embodiment.

Typically, LLMs are well-equipped to receive an input comprising text to produce a relevant response also comprising text. However, a number of challenges arise when LLMs are called on to process large data sets or to generate visual content, such as images, graphics, videos, charts, and the like, based on a user input comprising text. Moreover, LLMs are not well-equipped to modify data associated with an endpoint when the LLM initiated execution of an application programming interface (API) call against the endpoint. Additionally, users are not always familiar with the schema of the data.

With this in mind, embodiments of the technology described herein include functionality to programmatically determine commands for controlling or employing an LLM and utilizing its output based on a user query. In particular, based on a user query, a data set (or data sets) associated with the user query is determined. In some embodiments, a schema from the data set, such as a description of the data set, is determined. In an embodiment, the schema comprises a textual description, such as a prose or sequence of alphanumeric characters, that describes the data, data types, and/or data structure of the data set. In one embodiment, at least a portion of the schema is processed to determine semantic data associated with the data set. For example, the semantic data may comprise information about the data types in the data set and/or new data types. In an embodiment, new data types comprise types of data that are determinable from existing data types. Certain new data types are determined based on an intent or task of the user query. For example, where the existing data types in a data set include location of an object and time, a new data type indicates the speed of the object determined based on the location and time data.

In an embodiment, aspects of the semantic data are incorporated or merged with the schema to generate an enriched schema. For example, the schema is updated to include a description of the semantic data and any new data types so that the enriched schema describes a set of data that is usable for addressing an intent or task associated with the user query.

Embodiments of the technology described herein include generating, for the LLM, a prompt based on the user query, and including an aspect of the schema. In an embodiment, the prompt directs the LLM to generate computer instructions for processing the data in accordance with the user query and schema. For example, the computer instructions comprise an API call or parameters for generating an API call. In some instances, the computer instructions specify which specific data to access from the data set(s), new data types to be generated based on the data set(s), and/or how the data should be processed in accordance with the user query. In some embodiments, the computer instructions include instructions for generating visual representations of the data or processed data. For example, the computer instructions comprise parameters for an API call to a computing application that causes the computing application to generate a visual depiction of an aspect of the processed data, such as a graph or chart.

In response to the prompt, the computer instructions generated by the LLM are received. In an embodiment, the computer instructions are received by the LLM interface layer or received at the client layer. For example, where the computer instructions comprise an instantiated API call, the API call may be received and executed by a computing application operating at the client layer. In embodiments wherein the computer instructions comprise parameters for generating an API call, a computing service operating in the LLM interface layer generates an API call based on the parameters. For example, the generated API call is executed by a computing application operating at the client layer. In one embodiment, the computing application accesses and processes the data, from the data set(s), according to the computer instructions of the API call. In some instances, executing the computer instructions causes the computing application to generate visual content, such as graphical representations of aspects of data, responsive to the user query. Accordingly, the LLM is used to effectively process large volumes of data sets and to cause visual representations of the data to be provided in an efficient manner that reduces computational resource utilization and improves accuracy.

The present disclosure provides one or more technical solutions that have technical effects in light of various technical problems. For example, particular embodiments have the technical effect of improved accuracy relative to existing LLMs because in certain embodiments, the LLM is not receiving or processing large data sets, thereby reducing the likelihood of hallucinations associated with processing these large data sets. Particular embodiments have the technical effect of causing LLMs to create new data, responsive to a user query and based on the existing data, without a user having to specify the specific new data types to be created. In this manner, a data type, instead of the entire data set, can be accessed or created to produce a more accurate response, which existing language models do not do. Further, particular embodiments have the technical effect of reducing computational resource consumption by not requiring that the entire data set be used, accessed, or processed to generate visual content. Additionally, certain embodiments have the technical effect of increasing scalability, allowing computing systems to accommodate more user queries into an LLM by offloading computations from the LLM to the LLM interface layer or an endpoint associated with an API. Further, particular embodiments have the technical effect of determining which specific data should be processed (and which new data should be created) to respond to the user query. Further, particular embodiments have the technical effect of causing the LLM to generate computer instructions causing the data to be processed and/or visual content to be provided that is responsive to the user query. As a result, certain LLMs can determine how best to visually depict the data (and/or processed data) that is responsive to the user query by generating computer instructions to visually represent the data.

BRIEF DESCRIPTION OF THE DRAWINGS

The present disclosure is described in detail below with reference to the attached drawing figures, wherein.

DETAILED DESCRIPTION

Figure 1:
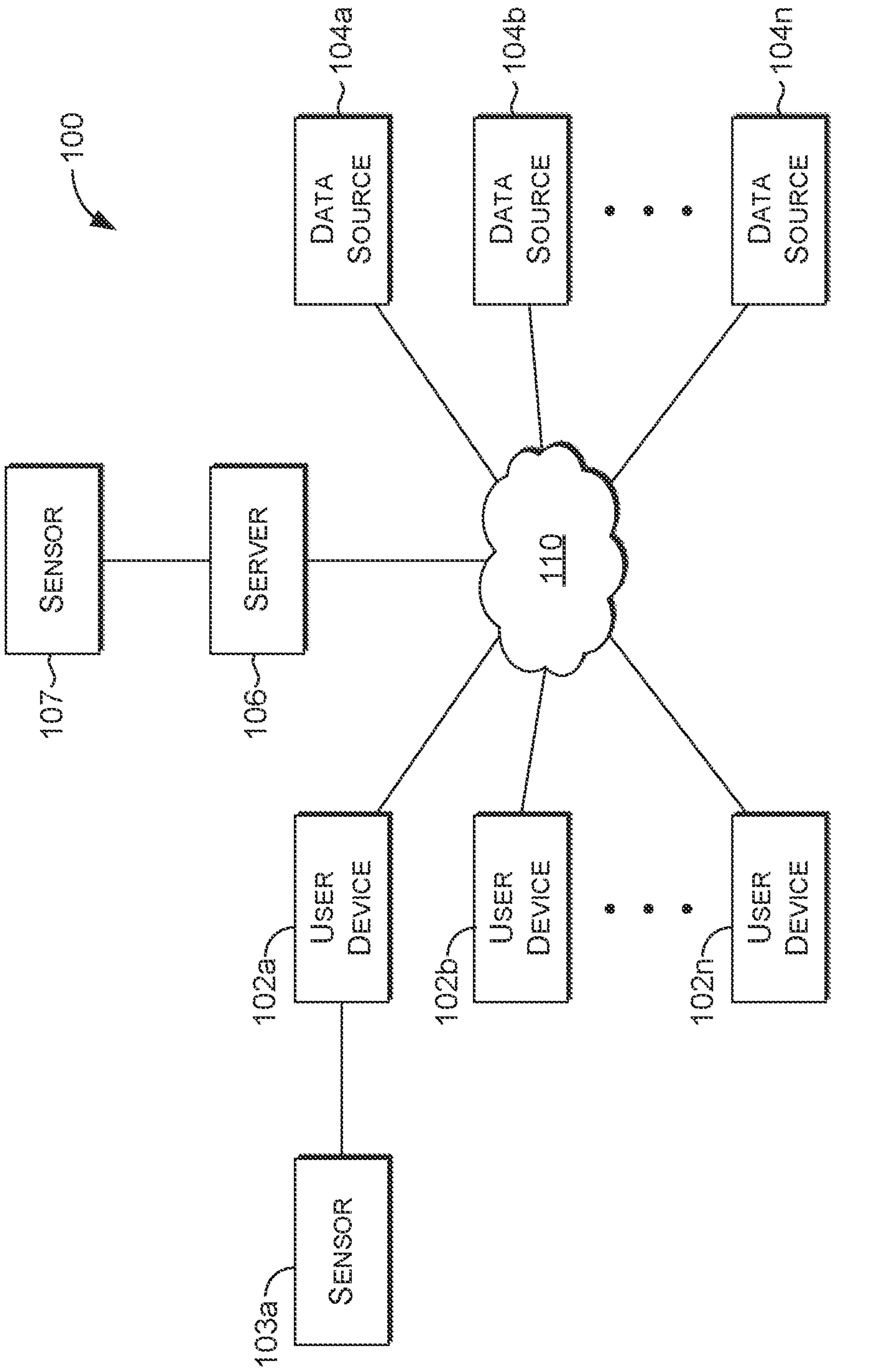
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, this disclosure contemplates that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Various embodiments discussed herein programmatically expand the capabilities of computing systems by enabling Large Language Models (LLMs) to process data sets, such as very large data inputs. Such data sets would otherwise not be possible or practical to process by an LLM due to LLM data input constraints or the high level of computational resources required. Further embodiments of the technology also expand the functionality of computing systems by enabling LLMs to be utilized for providing visual outputs of the data sets including processed or interpreted data based on the data sets. Although certain embodiments are discussed in the context of LLMs, it should be understood that certain embodiments of this disclosure are applicable to other types of language models, artificial intelligent (AI)-based models, and neural networks.

In particular, embodiments described herein include functionality to programmatically determine commands or prompts for directing an LLM and utilizing its output based on a user query. For example and according to one embodiment, a user, desiring to better understand work-life balance for their project team, issues a user query asking to see the work-life balance of their project team and whether it is improving. From the user's perspective, the user query can be issued directly to an LLM (for example, via UI for the LLM) or from within another application, such as Microsoft Excel® or PowerBI®. For example the user may issue the query using the "@Copilot" wake word, followed by the query "what is the work-life balance of my team and is it improving."

Continuing this example and embodiment, based on the user query, a data set (or data sets) associated with the user query is determined. For example, a data set is determined that includes an indication of hours worked each day for each member of the project team. In one embodiment, the data is arranged in any suitable format, such as tabular format, graph, vector, list, index, catalog, or key-value pair. By way of non-limiting example of a key-value pair, suppose a key-value pair data type is JSON. For example, suppose a data entry includes (1) Speed: 50 miles/hour; (2) Location: 47.6740° N, 122.1215° W; and (3) User name: USER123. In one embodiment, this data is stored in vectors that have a defined structure. An example vector includes definite user information formatted as: [user name][user ID][user loc][ID of device registered to user].

From the data set, a schema that describes the data set is determined. In one example, the "schema" refers to an organization or structure for maintaining data in a data structure, such as a database. The schema can be embodied as a description or metadata of semantic data contained in a data set or data type. For example, the schema includes a description that is determined based on a sample of the data, and/or the schema includes the sample. In one example, the schema corresponds to a blueprint that outlines a relational database's architecture, describing how data is organized within it and how its different elements, like foreign and primary keys, data types, and fields relate to one another. For certain databases, schemas are visually represented using an entity-relationship diagram, which depicts how values are stored, their relationship to one another, and the rules governing them. In one example, a schema is characterized based on any suitable "characterization" for the schema, including a description of the data or a portion of the data in the data set (for example, the description includes a prose indicative of a textual narrative describing the data or the portion of the data), a representation of at least a portion of the data in the data set, a representation of the organization or structure of the data, and a representative example or sample of a portion of the data in the data set.

In an embodiment, the schema comprises a textual description, such as a prose, that describes the data, data types, data formats, and/or data structure of the data set. Certain embodiments of the schema also include information or a description about accessing the data, such as data location and access information. In one example, the "data types" refer to a category, metadata, or classification of the entries of data or of a portion of the data in the data set. In one embodiment, the data type is determined by the LLM. In addition or alternatively, the data type is determined based on a semantic analysis of the data in the data set. Example data types include a dimension of the data set, including a column title or row title of entries of a database, a key-value pair, and the like. In one example, "a data set" refers to a single set of data, one or more data sets, or a plurality of data sets. In some embodiments, an aspect of the schema, instead of the data set itself, is communicated to the LLM for processing, thereby reducing the computational resource utilization associated with processing the initial prompt.

In one embodiment, an onboarding process enables the customization of data types or schema. For example, during an initial onboarding process, a graphical user interface (GUI) is generated for an authorized personnel to allow the authorized personnel to provide additional context or information associated with the data types and the schema. Continuing this example, the authorized personnel submits additional data, such as relations between columns, definitions for certain data types, and any suitable information, such as that discussed with respect to FIG. 3, among other data. In this manner, embodiments discussed herein bridge data gaps between the data types, the schema, and the LLM's knowledge (for example, based on the training data). Although this example is discussed in the context of an onboarding process, it should be understood that the customization of the data types or the schema can occur at any suitable time, such as during a testing phase, a deployment phase, and so forth.

In one embodiment, at least a portion of the schema is processed to determine semantic data associated with the data set(s). For example, the semantic data may comprise information about the data types in the data set, such as different semantic names for the data, and/or new data types determinable from existing data types. In one embodiment, the new data type is determined based on an intent or task associated with the user query. For example, where the existing data types in a data set include data indicating which hours of the day each team member worked, a new data type can be determined based on the user query. The new data type indicates how many of the hours worked for each employee are during business hours or outside of business hours over a time span, such as one week or month. In one embodiment, the semantic data includes information for how the new data type is determined based on the existing data types. In an embodiment, aspects of the semantic data, which include description of new data types and/or how new data types are determinable from existing datatypes in the data set, for example, are incorporated or merged with the schema to generate an enriched schema. In one embodiment, an aspect of the data set characterized by the schema comprises a data type of data that is not in the data set and is determinable from at least a portion of data in the data set. For example, the characterization comprises a description of how to determine that this data type is not in the data set. In this example, the schema includes a description of how to determine the new data from the existing data in the data set (or from at least a portion of the data in the data set).

Continuing this example and embodiment, as described herein, a prompt for an LLM is generated based on the user query and including an aspect of the schema (which may be enriched, as described previously). In an embodiment, the prompt directs the LLM to generate computer instructions for processing the data in accordance with the user query and schema. For example, the computer instructions comprise an API call or parameters for generating an API call. In some instances, the instructions specify which specific data to access from the data set(s), new data types to be generated based on the data set(s), and/or how the data should be processed in accordance with the user query. In some instances, the computer instructions include instructions for generating visual representations of the data or processed data. In one embodiment, the instructions comprise parameters for an API call referencing an endpoint of a computing application that causes the application to generate a visual depiction of an aspect of the processed data, such as a graph or chart.

In some embodiments, an aspect of the prompt is provided as input to the LLM. In response, computer instructions, such as an API call or API parameters for generating an API call, are received from the LLM. In some embodiments, the prompt and LLM response comprise multiple prompts and responses in a back-and-forth manner. In an embodiment, the computer instructions are received by the LLM interface layer or received at the client layer. For example, where the instructions comprise an instantiated API call, the API call is received and executed by a computing application operating at the client layer. In some embodiments, the instructions comprise parameters (for example, API parameters) for generating an API call, such that a computing service operating in the LLM interface layer generates an API call based on the API parameters. In one embodiment, the generated API call is executed by a computing application operating at the client layer. Accordingly, embodiments of the computing application access and process at least a portion of the data, from the data set(s), according to the instructions of the API call. In some instances, executing the instructions causes the computing application to generate visual content, such as graphical representations of aspects of data, responsive to the user query. For instance, continuing with the earlier example, for the data set that includes an indication of hours worked each day for each member of the project team, the instructions may comprise instructions for determining hours worked outside of business hours for each team member. Moreover, as the user query asked "is [the work-life balance] improving," the computer instructions may further comprise instructions for generating, via the application, visual content depicting a representation of the hours-worked-outside-of-business hours for each team member's overtime, such as the past quarter year.

In some embodiments, the visual content is generated in response to an API call that references API parameters associated with an endpoint. In one example, the "visual content" refers to images, charts, graphs, infographics, illustrations, animations, data visualizations, or any suitable visual representation of content. In one embodiment, the visual content includes data contained in a productivity application and that is assembled for end-user consumption, such as data contained in MICROSOFT® EXCEL®.

Although certain embodiments are discussed in the context of an API call being made to produce visual content, it should be understood that in some embodiments, any number of API calls can be made to produce any suitable output. For example, after the data is retrieved from the API and/or the visual content is initiated/generated, in one embodiment, the LLM interface layer (or the LLM) cause a second API call to be generated. For example, the second API call is generated to cause a response to be generated for the initial prompt. In this example, where the user query asked "is [the work-life balance] improving," the second API call causes a response to be generated based on the visual content generated. In this example, the response includes a string of alphanumeric characters summarizing an aspect of the visual content generated by the first API call. For example, in response to the second API call, a response includes "work life balance has improved for your team, whose average after-hours collaboration has drop to under 1 hour, which is similar to that of other teams in your organization, such as the Product, HR, and Marketing Team."

In general, the capabilities of LLMs are limited by the training data set of the LLM. In some instances, purely relying on the training data set makes certain LLMs susceptible to hallucinations. One way to address these hallucinations is by guiding an LLM to a target output by precise engineering prompting, whereby text used as a prompt for the LLM is manually structured to be better understood or interpreted by the LLM. However, a prompt input space has a token size limit, reducing the overall capabilities to address hallucinations and improve LLM accuracy through precise manual prompt engineering. Moreover, precise engineering prompting is a challenging endeavor because including too much information in the prompt (and in turn, including too many tokens) can cause the model to hallucinate while expending a large amount of computational resources. Additionally, LLMs are not equipped with the logic or capabilities to generate multimodal content, such as visual content based on a prompt including only text.

More recently, sources external to the LLM have been utilized to expand the capabilities of the LLM. For example, an LLM can communicate with these external sources (also referred to herein in one example as "endpoints") via an API of an endpoint. Typically, to communicate with these external sources, the LLM is prompted to use a particular endpoint via a prompt that includes the API of the endpoint and corresponding API input parameters. The prompt is generally a manual user input, which typically requires a user using APIs of endpoints to keep abreast of API developments and be sophisticated enough to manually input appropriate API parameters. Even if a user is sophisticated enough to manually utilize APIs, the user may not have direct access to the data managed by the endpoint, making it difficult to generate API calls that precisely access external data via the appropriate API in a meaningful manner. Precise use of APIs is further compounded by the fact that the limited users who do have proficiency using APIs do not know which of the many hundreds, thousands, or even millions of columns of data to call on.

For example, suppose a sophisticated user is tasked with finding out "if work-life balance is getting better for my team." In this example, the user can submit (1) a user query "is work-life balance getting better for my team," as well as an (2) API that that the user believes provides access to an endpoint containing relevant information. However, the user may not realize that the data managed by the data source associated with the API does not contain entries that identify the user's team or any metric that has been identified as being indicative of "work-life balance." If the user submitted this user query to an LLM, for example, the LLM will likely return an error. In another example, in response to the user query, the LLM accesses the entire data set associated with the API and returns a text response that is based on erroneous data, leading to an output having accuracy and precision that has been compromised by hallucinations. Furthermore, the response output by the LLM may have caused the LLM to expend a high quantity of computational resources in processing the prompt, as well as accessing and analyzing the entire data set (for example, hundreds, thousands, or even millions of columns of a structured database, such as one contained in a .CSV file, structured query language (SQL), and the like associated with API—only to lead to an inaccurate hallucination response. Moreover, LLMs are typically only equipped to generate a text output, so it would be difficult if not impossible for the user to receive a response as visual content.

With this in mind, embodiments discussed herein provide a technical solution to the deficiencies and limitations of existing technologies associated with leveraging LLMs to more efficiently initiate API calls and generate content (for example, visual content). Indeed, embodiments discussed herein improve the functionality of LLMs without directly modifying the LLM to cause visual content to be generated in a computationally efficient manner that reduces the effects or likelihood of hallucinations. In particular, whereas an LLM will typically access an entire data set as part of the analysis for responding to a user prompt, certain embodiments of this disclosure instead determine, identify, or generate a data type of the data set(s) based on a schema of the data set or the user query, such that the data set(s) remain external to the LLM. For example, if the data is stored as large spreadsheet(s), such as one or a plurality of .CSV files, SQL files, and the like, then the schema includes semantic data, such as the pages or description of columns in the spreadsheets, thereby enabling the LLM to know what the data contains without directly exposing the LLM to the specific values of the data. For example, suppose the data set is contained in a spreadsheet or other relational database. In this example, the semantic data indicates that the columns indicate organizational enterprise data, such that column 1 is employee IDs, column 2 is employee SSNs, column 3 is employee hire dates, column 4 is employee compensation, column 5 is how many hours the employee worked in the past year, and so forth.

Particular embodiments have the technical effect of improved accuracy relative to existing models. This is because various embodiments implement the technical solutions of accessing a data set for responding to the query, and then based on the data set, determining a schema that characterizes one data type in the data set, such that the data type is related to the query. At most, existing language models rely exclusively on their training data to perform operations, such as determining relevant data for responding to a user query. However, this training data typically does not include the schema or other understandings associated with an endpoint, so the LLM employed in these existing contexts is prone to hallucination without the embodiments disclosed herein. Instead, particular embodiments disclosed herein cause the LLM to not receive or process large data sets, thereby reducing the likelihood of hallucinations associated with processing these large data sets.

Particular embodiments have the technical effect of causing LLMs to create new data, responsive to a user query and based on the existing data, without a user having to specify the specific new data types to be created. In this manner, a data type, instead of the entire data set, can be accessed or created to produce a more accurate response without a user specifying the data type, which existing language models do not do. In this manner, the LLM is provided with the schema, the data type, or the new data type so that the language model does not have to rely solely on a user input, which may be erroneous or not specific enough, to cause an endpoint to manipulate a data set.

Certain embodiments have the technical effect of reduced computational resource consumption relative to existing models. As discussed above, certain existing LLMs can perform a search for relevant content, but LLMs typically do not have an understanding of an endpoint accessible via an API. Moreover, searching an entire database associated with the endpoint is a computational extensive process, especially when coupled with the tokenization of the user prompt. To reduce computational resource consumption, certain embodiments discussed herein generate a prompt comprising a first indication associated with the user query, a second indication associated with the schema, and an instruction directing the LLM to generate a set of computer instructions. In this manner, the LLM is "intelligently guided" to the endpoint without the LLM having to perform extensive computations associated with searching an entire database.

Additionally, certain embodiments have the technical effect of increasing scaling to allow servers to process, serially or in parallel, dozens, hundreds, thousands, or even millions of user prompts for generating visual content. Indeed, given the current token size limitations associated with the input prompt space, users are currently limited by these token size limitations when they formulate a prompt or try to point an LLM to an endpoint. To the extent that certain existing approaches allow an LLM to pull data from an external API, such action occurs based on API-related information included in the initial prompt, which is a slow process requiring lots of time for computing. Processing speed and therefore scalability is improved using these embodiments since the data type related to the user query is identified, for each user prompt, based on the schema, causing the LLM to initiate an action (for example, API call) on a relevant data type. In this manner, the data center can process more requests more quickly, allowing it to scale and provide responses to more user queries.

Further, particular embodiments have the technical effect of determining which specific data should be processed (and which new data should be created) to respond to the user query. Further, particular embodiments have the technical effect of causing the LLM to generate computer instructions causing the data to be processed and/or visual content to be provided that is responsive to the user query. As a result, certain LLMs can determine how best to visually depict the data (and/or processed data) that is responsive to the user query by generating computer instructions to visually represent the data.

Turning now to FIG. 1, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as user devices 102*a* and 102*b* through 102*n*; a number of data sources, such as data sources 104*a* and 104*b* through 104*n*; server 106; sensors 103*a* and 107; and network 110. It should be understood that the operating environment 100 shown in FIG. 1 is an example of one suitable operating environment. Each of the components shown in FIG. 1 is implemented via any type of computing device, such as computing device 900 illustrated in FIG. 9, for example. In one embodiment, these components communicate with each other via network 110, which includes, without limitation, one or more local area networks (LANs) and/or wide area networks (WANs). In one example, network 110 comprises the internet, intranet, and/or a cellular network, amongst any of a variety of possible public and/or private networks.

It should be understood that any number of user devices, servers, and data sources can be employed within operating environment 100 within the scope of the present disclosure.

Figure 10:
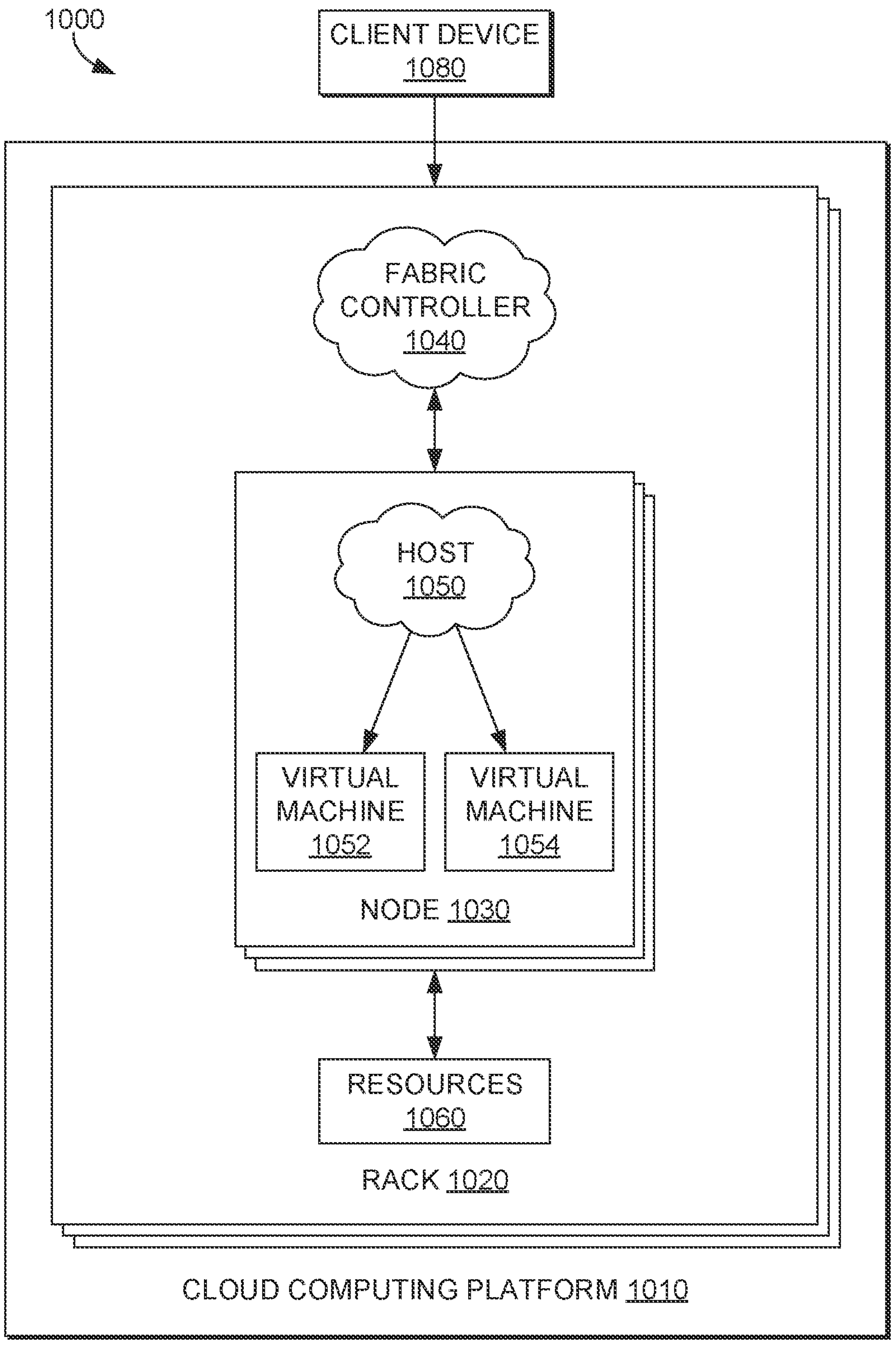
FIG. 10 is a block diagram of an example computing environment suitable for use in implementing an embodiment of the present disclosure.

Each may comprise a single device or multiple devices cooperating in a distributed environment, such as the distributed computing environment 1000 in FIG. 10. For instance, server 106 is provided via multiple devices arranged in a distributed environment that collectively provides the functionality described herein. Additionally, other components not shown may also be included within the distributed environment.

User devices 102*a* and 102*b* through 102*n* can be client user devices on the client-side of operating environment 100, while server 106 can be on the server-side of operating environment 100. Server 106 can comprise server-side software designed to work in conjunction with client-side software on user devices 102*a* and 102*b* through 102*n* so as to implement any combination of the features and functionalities discussed in the present disclosure. For example, user device 102*a* receives a prompt (for example, a language model prompt) that is communicated via network 110 to the server 106, and the server 106 runs the LLM to determine and generate a response to the prompt. This division of operating environment 100 is provided to illustrate one example of a suitable environment, and there is no requirement for each implementation that any combination of server 106 and user devices 102*a* and 102*b* through 102*n* remain as separate entities.

In some embodiments, user devices 102*a* and 102*b* through 102*n* comprise any type of computing device capable of use by a user. For example, in one embodiment, user devices 102*a* and 102*b* through 102*n* are the type of computing device 900 described in relation to FIG. 9. By way of example and not limitation, a user device is embodied as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or an MP3 player, a global positioning system (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

In some embodiments, data sources 104*a* and 104*b* through 104*n* comprise data sources and/or data systems, which are configured to make data available to any of the various constituents of operating environment 100 or system 200 described in connection to FIG. 2. For instance, one or more data sources 104*a* and 104*b* through 104*n* provide (or make available for accessing) an API response based on the API call. In one embodiment, one or more data sources 104*a* and 104*b* through 104*n* correspond to the endpoints discussed herein. Certain data sources 104*a* and 104*b* through 104*n* are discrete from user devices 102*a* and 102*b* through 102*n* and server 106 or are incorporated and/or integrated into at least one of those components. In one embodiment, one or more of data sources 104*a* and 104*b* through 104*n* comprise one or more sensors, which are integrated into or associated with one or more of the user device(s) 102*a* and 102*b* through 102*n* or server 106. Examples of data made available by data sources 104*a* and 104*b* through 104*n* can include any suitable data made available to the LLM interface layer 210 of FIG. 2.

Figure 2:
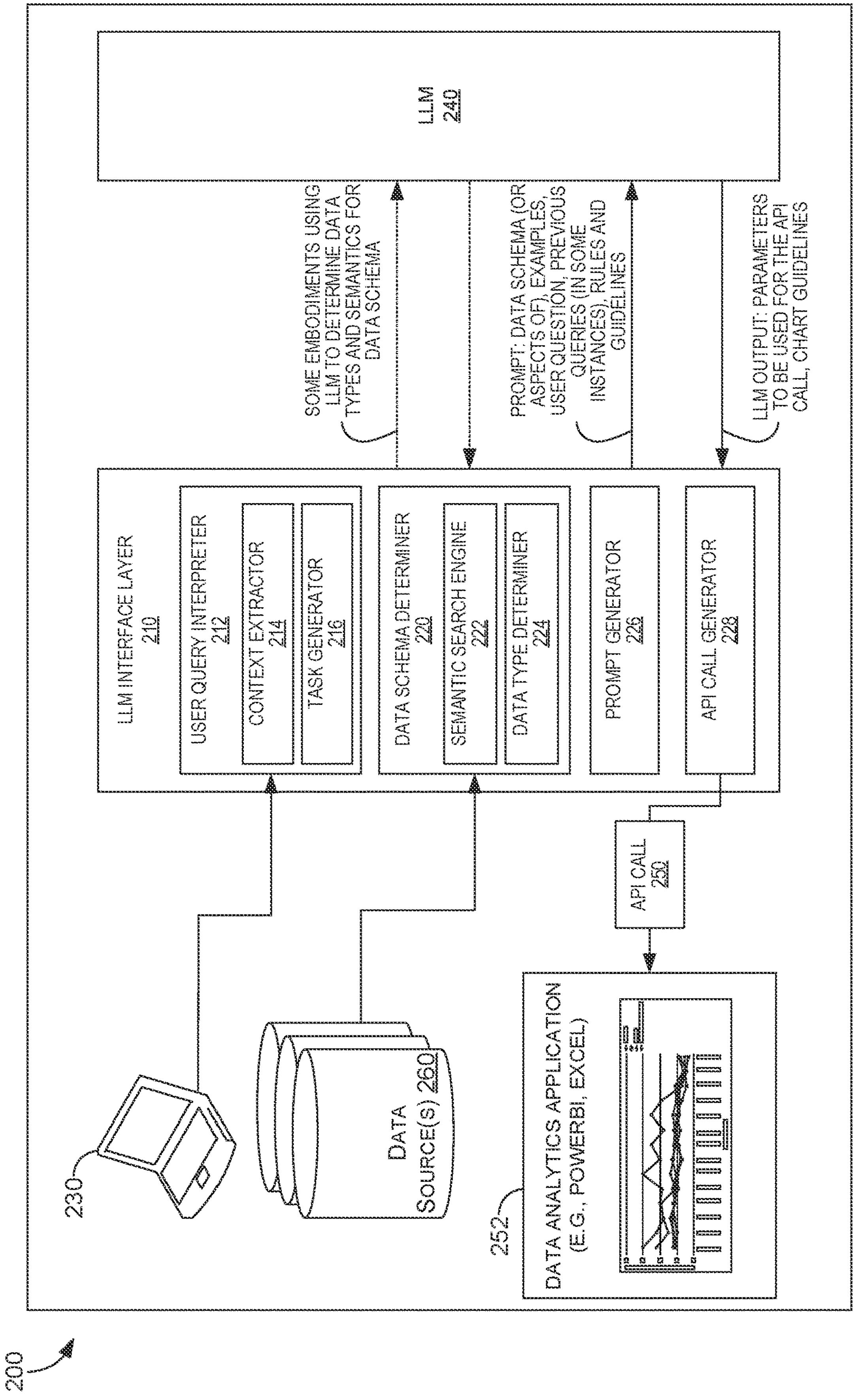
FIG. 2 is a block diagram of an example system including a large language model (LLM) interface layer positioned between a user device and a language model, in accordance with an embodiment of the present disclosure.

Operating environment 100 can be utilized to implement one or more of the components of system 200, as described in FIG. 2, to perform any suitable operations, such as receiving an initial prompt, determining a data set for responding to the initial prompt; determining, for the data set, a schema that characterizes an aspect of the data set; generating for an LLM a first prompt comprising a first indication associated with the initial prompt, a second indication associated with the schema, and an instruction directing the LLM to generate a set of computer instructions, comprising at least one instruction for processing the data in the data set responsive to the initial prompt; receiving a response to the first prompt from the LLM comprising the set of computer instructions; and/or generating an API call or causing an API call to be generated. Operating environment 100 can also be utilized for implementing aspects of methods 600, 700, and 800 in FIGS. 6, 7, and 8, respectively.

Referring now to FIG. 2, depicted is a block diagram of an example system 200 including an LLM interface layer 210. The illustrated LLM interface layer 210 includes a user query interpreter 212, including context extractor 214; schema determiner 220 including a semantic search engine 222 and a data type determiner 224; prompt generator 226; and an API call generator 228. In some embodiments, the LLM interface layer 210 is positioned between a user device 230 and an LLM 240, in accordance with an embodiment of the present disclosure. Example system 200 also includes an API call 250 and data source 260.

With reference to the LLM interface layer 210, the user query interpreter 212 is generally responsible for receiving an input that includes an initial prompt (or user query) intended for the LLM 240 and determining information, such as an intent and contextual information, associated with the user prompt. In one example, a "prompt" as described herein includes one or more of: a request (for example, a question or instruction [for example, "is my team being productive this month," or "write a poem"]), a query, target content, and one or more examples, as described herein. In some embodiments, the prompt is received as alphanumeric characters or as raw audio, to name a few non-limiting examples. In one example, "initial prompt" refers to the prompt directly received from the user, and which is unaltered by the LLM interface layer 210. In one embodiment, the initial prompt is not communicated directly to the LLM 240 and is instead processed by the LLM interface layer 210 to generate one or more prompts, as discussed herein.

In some embodiments, the user query interpreter 212 employs computing logic to infer an intent associated with an initial prompt. For example, the intent associated with the initial prompt is determined based on contextual information determined by the context extractor 214 of the user query interpreter 212. In some embodiments, context extractor 214 accesses user activity information and the initial prompt. Examples of user activity information include user location, app usage, online activity, searches, communications such as chat, call, or any suitable user-communication item data (including, for example, the duration of meeting, topics of the meeting, and speakers of the meeting), types of communication items with which a user interacts, usage duration, application data (for example, emails, meeting invites, messages, posts, user statuses, notifications, etc.), or nearly any other data related to user interactions with the user device or user activity via a user device. For example, a user's location is determined using GPS, indoor positioning (IPS), or similar communication functionalities of a user device associated with a user.

Embodiments of the context extractor 214 utilize the user activity information and the initial prompt to determine contextual information, also referred to herein in one example as a "context," defining an intent associated with the initial prompt. As described herein, certain context (or context logic) is used to determine an intent and corresponding tasks associated with the initial prompt to determine a data set for responding to the initial prompt, to determine a schema characterizing an aspect of the data set, and to cause an API call to be generated, among other operations. By way of example, a context comprises information about a user's current activity, such as application usage, application consumption time, communication or interaction during consumption of an application or while interacting with an application, or other suitable interactions. For instance, a context can indicate types of user activity, such as a user performing a task, such as performing a work-related task, sending a message, or viewing content. Alternatively, or in addition, a user can explicitly provide a context, such as performing a query for a particular topic or content, which is capable of being performed by engaging with a search tool of a productivity application or by submitting the initial prompt intended for the LLM 240. In one embodiment, a context includes information about an initial prompt or related applications and operating system (OS) features with which the user is interacting or accessing information about—as in where a user hovers their mouse over any suitable graphical user interface (GUI) elements.

Some embodiments of context extractor 214 determine context related to a user action or activity events, such as people or entities identified in a user activity or related to the activity (for example, recipients of a message comprising content generated by the LLM), and utilize a named-entity extraction model or named-entity recognition model. In some embodiments, context extractor 214 comprises one or more applications or services that parse or analyze information detected via one or more user devices used by the user and/or cloud-based services associated with the user to identify, extract, or otherwise determine a user-related or user device-related context. Alternatively, or in addition, some embodiments of context extractor 214 monitor user activity information. In some embodiments, this information comprises features (sometimes referred to herein as "variables") or other information regarding specific user-related activity and related contextual information. Some embodiments of context extractor 214 determine, from the monitored user activity data and the initial prompt, intent associated with the initial prompt based on the particular user, user device, or a plurality of users (such as a specific group of people, a group of people sharing a role within an organization, a student, a professor, or faculty), and/or user devices. In some embodiments, an intent determined by context extractor 214 is provided to other components of system 200 or stored in a user profile associated with a user.

Continuing with the LLM interface layer 210, the task generator 216 is generally responsible for determining a task based on the intent and context determined by the user query interpreter 212. In some embodiments, the task generator 216 employs task determination logic to determine the task. In one embodiment, the task generator 216 receives data from the user query interpreter 212 (such as the user input into the prompt), corresponding context (from the context extractor 214), and an intent determined from the user input and the corresponding context. In some embodiments, the task generator 216 determines a task based on certain semantics contained in the user input. For example, the subject-verb arrangement of the intent is translated into a task.

To help illustrate, suppose a user submits, into a prompt space, the following user query: "is work-life balance getting better for my team." Based on this user query, embodiments of the LLM interface layer 210 extract from the user query an intent and a task. In this example, the user query interpreter 212 intercepts this initial prompt and determines at least one intent contained in this initial prompt. From each identified intent, an example task generator 216 determines corresponding tasks. In one embodiment, the intents are determined from the verbs in the prompt, such as "is," "find," "summarize," and "provide." For the intent in this example, the intent is "determine work-life balance for my team." The task generator 216 determines a first task, for example, "search a productivity application for work-life balance data for a team of the user." The task generator 216 determines a second task, for example, "display this data as a visual." As illustrated by this example, embodiments of the task generator 216 translate the intent determined by the user query interpreter 212 into at least one task. In some embodiments, the task generator 216 communicates the output from the user query interpreter 212 to the schema determiner 220 or any other component of system 200.

In some embodiments, the user query interpreter 212 leverages the LLM 240 to perform the functionality described with respect to the user query interpreter 212. For example, the prompt generator 226 submits the initial query to the LLM to determine context or at least one corresponding task.

Continuing with the LLM interface layer 210, the schema determiner 220 is generally responsible for determining a schema for a data set. Embodiments of the schema determiner 220 include a semantic search engine 222 that performs a search for the data set that is relevant to the user query (received by user query interpreter 212) or the tasks (generated by task generator 216). Certain embodiments of the schema determiner 220 or the semantic search engine 222 employ relevance logic to determine a data set that is relevant to the user query. In one embodiment, the LLM interface layer 210 performs a semantic search for a data set associated with the task and/or intent extracted from the user input, among other operations. In some embodiments, the semantic search engine 222 performs a search for a data set based on the user query or a task extracted from the user query.

In one embodiment, the semantic search engine 222 performs a semantic analysis and is embodied as rules or a classification model that is employed by LLM 240. In one embodiment, the semantic search engine 222 leverages the LLM 240 to perform the functionality described with respect to the semantic search engine 222. For example, the semantic search engine 222 submits a prompt including a first indication of the intent and task, and receives an initial response from the LLM 240 indicative of the data type not being near the intent or the task, in semantic vector space. In this example, the semantic search engine 222 communicates another prompt including a second indication of the intent, the task, and the initial response until a subsequent response from the LLM is near the intent or the task in the semantic vector space. In this manner, the LLM interface layer 210 can iteratively communicate with the LLM 240 until a suitable response is received.

For example, the prompt generator 226 submits the initial query, the context, or the at least one corresponding task to determine the data set for responding to the initial query. In one embodiment, the semantic search is performed by the LLM 240, for example, based on a prompt communicated by prompt generator 226. In one embodiment, the semantic search engine 222 determines the data set specific to one task, the corresponding intent, and/or related contextual information. In one embodiment, the semantic search engine 222 generates a query against data sources 260 for a data set containing data that is suitable for responding to a corresponding task received from task generator 216 or to the user query. As described herein in one example, a "semantic search" refers to a search technique that extends traditional keyword-based searches to understand the meaning and context of the words used in a query. Instead of simply matching search terms, an example semantic search aims to comprehend the intent behind a user's query and deliver more relevant search results. For example, a semantic search relies on natural language processing (NLP) and artificial intelligence (AI) implemented by an LLM to analyze the semantics, relationships, and context of words and phrases in documents or web pages.

In one embodiment, the semantic search engine 222 performs a search (for example, a semantic search) for a data set against one or more databases of the data sources 260. In one example, the data sources 260 correspond to data repositories containing any suitable data, such as data managed by a third party (separate from that if the client device 230, LLM interface layer 210, and the LLM 240). In one embodiment, the data set corresponds to data accessible via a LLM skill. In one example, an "LLM skill" refers to a data structure that includes a description of a software interface and the software interface itself. The software interface, such as an API, generally provides the user and an language model, such as the LLM 240 or the user device 230, access to a corresponding software application, including the data set and functionality of the corresponding software application. In one embodiment, the software application includes external data associated with an external data source.

Embodiments of the semantic search engine 222 perform a search to find related LLM skills or data sets within a semantic vector space to the initial user query or the task, for example, through the use of word embedding and vector representations of the task and query. In some embodiments, proximity of the task to another data set is indicative of a level of relatedness. In some embodiments, the data set contains one or more data types that are semantically similar to and near in the vector space to the task. For example, each word in a corpus (collection of text) is represented as a high-dimensional vector in a semantic vector space. These vectors can be created using techniques like Word2Vec, GloVe, Bidirectional Encoder Representations from Transformers (BERT), or any suitable technique. In one embodiment, documents such as articles associated with LLM skills, web pages associated with LLM skills, databases associated with the LLM skill, or queries associated with LLM skills are also transformed into vectors by aggregating or averaging the word embeddings of the words within them, generating a vector representation of the document's semantic meaning. To find related results, embodiments of the semantic search engine 222 calculate the semantic similarity between the vector representation of the query associated with the task or user query and the vector representations of data sets and corresponding data types in the data sets. Example similarity measures include cosine similarity or Euclidean distance. In some embodiments, the semantic search engine 222 utilizes a relevance threshold to filter out LLM skills or data sets that are not sufficiently similar to the task or query, ensuring that those LLM skills or data sets that satisfy the relevance threshold are surfaced as candidate LLM skills or data sets. Certain embodiments of the semantic search engine 224 incorporate user feedback to improve results over time. For example, if a user utilizes certain LLM skills at a high frequency, the system 200 learns to give those types of LLM skills, and corresponding data sets, higher relevance in future searches.

In one embodiment, the initial query is processed to detect an entity (for example, "my project team"). Thereafter, embodiments of the semantic search engine 222 search data that is accessible to the user to find data set(s) that correspond to the entity. For example, data sets that have data for "my project team" or have metadata indicating they are relevant to "my project team." In this example, the search results indicate which data set(s) has this correspondence, and those data set(s) are the determined data set. In one embodiment, the data that is searched comprises user-accessible data, the user-accessible data comprising data that is accessible to a user associated with the query and that is stored in at least one user-accessible data set.

Continuing the example above, for the user query "determine work-life balance for my team," the semantic search engine 222 identifies software applications, resources, and databases associated with the corresponding tasks of "search a productivity application for work-life balance data for a team of the user" and "display this data as a visual." For example, the semantic search engine 222 performs a semantic search to determine data sources containing data indicative of "work-life balance." In one embodiment, the software applications, resources, and databases containing this information are separate from the user device 230, the LLM interface layer 210, and the LLM 240. For example, the information searched by the semantic search engine 224 is contained in the example data sources 260. In one example, the example data sources 260 store a catalog of LLM skills, including two, four, five, dozens, hundreds, thousands, millions, or any number of LLM skills, and corresponding data sets. Based on the search, embodiments of the semantic search engine 224 determine at least one data set relevant to the user query or task discussed in this example.

In an embodiment, the semantic search engine 222 determines a schema for the identified data sets. In one example, the schema comprises a textual description, such as a prose, that describes the data, data types, and/or data structure of the data set. In one embodiment, semantic search engine 222 processes at least a portion of the schema to determine semantic data associated with the data set. For example, the semantic data comprises information about the data types in the data set and/or new data types. In an embodiment, new data types comprise types of data that are used by data type determiner 224 to determine the new data types from existing data types.

Continuing with the schema determiner 220, the data type determiner 224 is generally responsible for determining a data type from the data set or schema determined by the semantic search engine 222. Certain embodiments of data type determiner 224 employ data type determination logic to determine a data type that is most relevant to the initial prompt, the task, or the intent. In some embodiments, if a data type satisfying a threshold level of relevancy does not exist within the data set, the data type determiner 224 generates a new data type. In one embodiment, the data type determiner 224 receives, from the semantic search engine 222 or the LLM 240, the data set containing the most relevant data set. From this data set, the data type determiner 224 can perform another semantic search against each data type in the data set (determined or identified by the semantic search engine 222) to determine the most relevant data type. In one embodiment, the data type determiner 224 leverages the LLM 240 to perform the functionality described with respect to the data type determiner 224. For example, the data type determiner 224 submits the initial query, the context, or the at least one corresponding task to determine the data type from the data set. In one embodiment, the semantic search is performed by the LLM 240, for example, based on a prompt communicated by prompt generator 226.

Embodiments of the data type determiner 224 perform another search to determine one or more data types within the data set that are within a semantic vector space to the task, for example, through the use of word embedding and vector representations of the task and query. In some embodiments, proximity of the task or user query to a data type of the data set is indicative of a level of relatedness. In some embodiments, the data types that are semantically similar to and near in the vector space to the task or user query are identified, for example, using any of the word embedding or vectorization techniques discussed herein. To find related results, embodiments of the data type determiner 224 calculate the semantic similarity between the vector representation of the query associated with the task and the vector representations of data types of the data set. Example similarity measures include cosine similarity or Euclidean distance. In some embodiments, the data type determiner 224 utilizes a relevance threshold to filter out data types that are not sufficiently similar to the task or query, ensuring that data types that satisfy the relevance threshold are surfaced as data types. Certain embodiments of the semantic search engine 224 incorporate user feedback to improve results over time.

In some embodiments, the data type determiner 224 determines that a data type satisfying the relevancy threshold does not exist. In response to determining that the data type satisfying the relevancy threshold does not exist, embodiments of the data type determiner 224 perform an operation on the most relevant data type(s) to generate a new data type. Example data manipulations include an arithmetic operations, such as addition, subtraction, multiplication, division, calculating an average (or mean or median), matrix operations, and the like. In one embodiment, determining the data type comprises generating a new data type (for example, a new data structure, such as a column, key-value pair, and so forth) comprising at least one of (1) a portion of the data set that is less than the entire data set or (2) an updated data type that comprises an arithmetic operation performed on the data set to reduce a size of the data set. In one embodiment, the new data type is added to the schema.

In one example, the data type determiner 224 identifies data types related to the user query of the initial prompt and determines, with a query based on a semantic analysis, that the data types have a first level of relatedness to the user. In this example, the data type determiner 224 performs an operation on data types to generate a new data type. In this example, the new data type has a second level of relatedness to the user query that is higher than the first level of relatedness.

Continuing the example where a user query includes: "is work-life balance getting better for my team." In this example, the data type determiner 224 determines that the data set from the semantic search engine 222 does not include a data type satisfying the relevancy threshold. Here, the data type determiner 224 determines that the most semantically related columns or metadata contained within the data set are the data types labeled as "hours worked per day," "vacation hours taken this year," and "Finance Team." In this example, the data type determiner 224 performs an arithmetic calculation, such as adding the entries in "hours worked per day" during each 7-day interval to generate a new data type (for example, column) of "hours worked per week," and accesses this new data type to respond to the query. Furthermore, in this example, the data type determiner 224 determines the "hours worked per week" for each member of the various teams and performs another arithmetic calculation, such as averaging the "hours worked per week" across the "Finance Team," which is the team that the user is a part of. In one embodiment, the data type determiner 224 updates the schema to include this new data type containing at least one entry of enriched data (in this example, the new data structure indicative of "hours worked per week" for each team, such as the "Finance team") that is not included in the initial data set. For example, the data type determiner 224 adds a new column (or other data structure) labeled as "average hours worked per week for the finance team." In one embodiment, the new data type (which in this example is a new column) is added to the schema to generate enriched schema.

In an embodiment, the data type determiner 224 incorporates aspects of the semantic data into the schema to generate an enriched schema. For example, the schema is updated to include a description of the semantic data and any new data types so that the enriched schema describes a set of data that is usable for addressing an intent or task associated with the user query.

Continuing with the schema determiner 220, the prompt generator 226 is generally responsible for generating a prompt that is communicated to the LLM to leverage functionality of the LLM 240. Certain embodiments of prompt generator 226 employ prompt generation logic to generate a prompt indicative of generating an API call. In one embodiment, the prompt generator 226 generates a prompt that includes any of the data accessed, determined, or generated by components of system 200. For example, the prompt generator 226 generates a prompt based on the user input (for example, user prompt received from user device 230), the tasks or context extracted by the user query interpreter 212, the schema or the data type determined by the schema determiner 220, and the like. In one embodiment, the prompt generator 226 generates a prompt that includes an indication of the schema, the data type, a previous user query, and corresponding results. Continuing the example, the prompt generator 226 generates a prompt such as "generate a graphic representation indicative of [[tasks]]," where [[tasks]] refers to the tasks determined by the user query interpreter 212.

In some embodiments, the prompt generator 226 generates a prompt for the LLM 240 that includes at least one of a first indication associated with the user query (received from the user device 230 or from the user query interpreter 212), a second indication associated with the schema (received from schema determiner 220), and an instruction directing the LLM 240 to generate a set of computer instructions. Continuing the example above, the prompt generator 226 generates a prompt that includes (1) "work-life balance" as the first indication indicative of the user query, (2) an indication of the new column (or other data structure) labeled as "average hours worked per week for the finance team" as the second indication indicative of an aspect of the schema, and (3) "generate an API call against the productivity application" as the third indication indicative of instruction directing the LLM 240 to generate a set of computer instructions. In this manner, the LLM 240 is prompted to generate an API call for a 250.

In an embodiment, the prompt generator 226 generates a prompt directing the LLM 240 to generate computer instructions for processing the data in accordance with the user query and schema. For example, the computer instructions from the LLM 240 comprise an API call 250 or parameters for generating an API call 250. In some instances, the computer instructions from the LLM 240 specify which specific data to access from the data set(s), new data types to be generated based on the data set(s), and/or how the data should be processed in accordance with the user query. In some instances, the computer instructions from the LLM 240 include instructions for generating visual representations of the data or processed data. In one embodiment, the instructions comprise parameters for an API call 250 referencing an endpoint (for example, data sources 260) of a computing application 252 that causes the computing application 252 to generate a visual depiction of an aspect of the processed data, such as a graph or chart.

In some embodiments, an aspect of the prompt is provided as input to the LLM. In response, computer instructions, such as an API call 250 or API parameters for generating an API call, are received from the LLM. In some embodiments, the prompt and LLM response comprises multiple prompts and responses in a back-and-forth manner. In an embodiment, the computer instructions are received by the LLM interface layer 210 or received at the client layer. For example, where the instructions comprise an instantiated API call, the API call 250 is received and executed by a computing application operating at the client layer. In some embodiments, the instructions comprise parameters (for example, API parameters) for generating an API call 250, a computing service, such as the API call generator 228, operating in the LLM interface layer generates an API call 250 based on the API parameters. In one embodiment, the generated API call 250 is executed by a computing application operating at the client layer. Accordingly, embodiments of the computing application access and process at least a portion of the data, from the data set(s), according to the instructions of the API call 250. In some instances, executing the instructions causes the computing application 252 to generate visual content, such as graphical representations of aspects of data, responsive to the user query. For instance, continuing with the earlier example, for the data set that includes an indication of work-life balance for each member of the finance team, the instructions may comprise instructions for determining hours worked outside of business hours for each team member. Moreover, as the user query asked "is [the work-life balance] improving," in this example, the computer instructions further comprise instructions for generating, via the application, visual content depicting a representation of the hours-worked-outside-of-business hours for each team member's overtime, such as the past quarter year. In some embodiments, the visual content is generated in response to an API call 250 that references API parameters associated with an endpoint.

The API call generator 228 is generally responsible for generating an API call 250 associated with computer instructions received from the LLM 240. In some embodiments, the API call generator 228 utilizes API logic to execute an API call 250 associated with an endpoint based on computer instructions from the LLM 240. In some embodiments, the API call generator 228 generates an API call 250 against an API of a computing application 252 to retrieve data from data sources 260, including websites or external services. For example, the API call generator 228 sends requests to specific API endpoints associated with an API included in the computer instructions from the LLM 240 to retrieve information in a structured format (for example, JavaScript Object Notation [JSON] or Extensible Markup Language [XML]) that would be responsive to the initial request. In this example, the API call 250 generated by the API call generator 228 causes the LLM interface layer 210 or the LLM 240 to receive the information in the structured format. In one embodiment, generating the API call 250 includes executing an API call that is received as computer instructions in the output from LLM 240. For example, the received set of computer instructions include instructions for an API call. In another embodiment, the received set of computer instructions are used by a component of the LLM interface layer 210 (for example, the API call generator 228) to generate an API call.

Although certain embodiments are discussed in the context of an API call 250 being made to produce visual content, it should be understood that in some embodiments, any number of API calls can be made to produce any suitable output. For example, after the data is retrieved from the API and/or the visual content is initiated/generated, in one embodiment, the LLM interface layer (or the LLM) cause a second API call to be generated. For example, the second API call is generated to cause a response to be generated for the initial prompt. In this example, where the user query asked "is [the work-life balance] improving," the second API call causes a response to be generated and presented on the user device 230 based on the visual content generated. For example, in response to the second API call, a response includes "work life balance has improved for your team, whose average after-hours collaboration has drop to under 1 hour, which is similar to that of other teams in your organization, such as the Product, HR, and Marketing Team."

Based on the API call 250 generated by API call generator 228 or the LLM 240, the LLM interface layer 210 or client layer can received the API response and transform the data into a format that is consumable by the user. For example, continuing the example above where the initial prompt included a query asking if work-life balance is improving, the LLM 240 or the LLM interface layer 210 receives the information included in the API response and restructures the information into a graph that is legible by the client device (for example, desktop or mobile device). An example visual content that includes a graph is discussed below with respect to FIGS. 5A and 5B.

In some embodiments, various components of system 200 communicate with the LLM 240 or the LLM interface layer 210 via one or more applications or services on a user device, across multiple user devices, or in the cloud, to coordinate presentation of a response to the initial prompt in a format requested by the user. In one embodiment, LLM 240 or the LLM interface layer 210 manages the presentation of the response to the initial prompt based on the initial prompt and the schema, across multiple user devices, such as a mobile device, laptop device, virtual-reality (VR) headset, and so forth.

Figure 3:
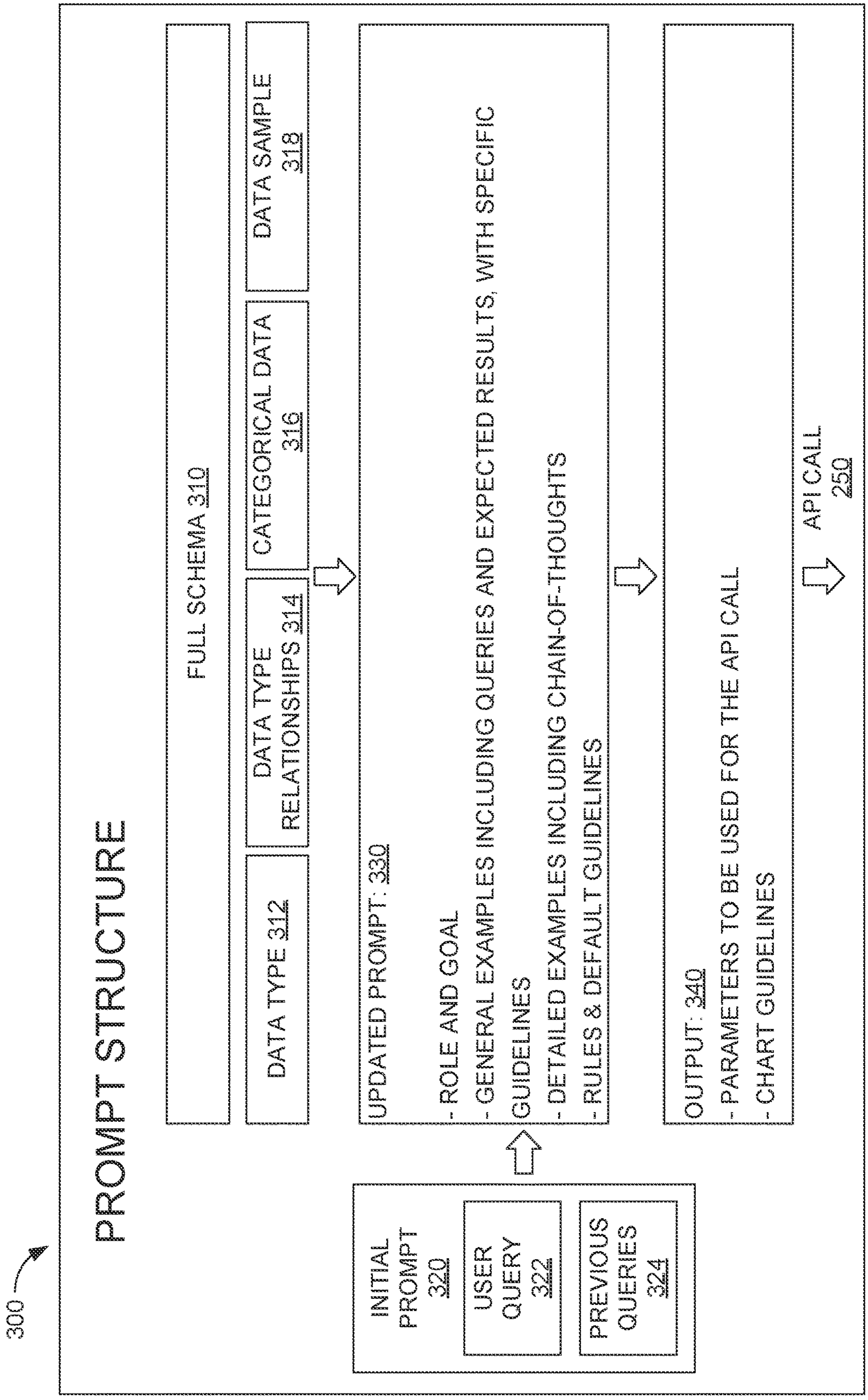
FIG. 3 is a flow diagram for implementing a user query and schema to efficiently generate an API call used to generate visual content, in accordance with an embodiment of the present disclosure.

FIG. 3 is a schematic flow diagram 300 for implementing schema 310 and an initial prompt 320 to efficiently generate an API call 250 used to generate an API call, in accordance with an embodiment of the present disclosure. In one embodiment, the schema 310 and the initial prompt 320 are used to generate a prompt that is sent to the LLM 240 (FIG. 2) to cause the LLM to generate computer instructions for generating an API call 250, for example, causing an endpoint to generate visual content responsive to the initial prompt.

As illustrated, the schema 310 includes semantic data, such as data types 312, data type relationships 314, categorical data 316, and data sample 318. In one embodiment, a portion of the schema 310, such as the data types 312 or the data sample 318, is predetermined. Alternatively or additionally, a portion of the schema 310 is determined based on at least a sample of the data in the data set, the metadata associated with the data set, or an arrangement of the data in the data set. Example determined schema 310 includes new data types, data type relationships 314, and categorical data 316, to name a few. In one embodiment, at least a portion of the schema 310 is supplemented or manually customized during an onboarding process or any other time during the use of the embodiments described herein.

As described herein, embodiments of the schema 310 are determined by the schema determiner 220 of FIG. 2. In an embodiment, the schema 310 comprises a textual description, such as a prose, that describes the data, data types, data formats, and/or data structure of the data set. In one example, the schema is embodied as a description or metadata of semantic data contained in a data set or data type. Certain embodiments of the schema 310 also include information or a description about accessing the data, such as data location and access information. In one embodiment, the schema is determined based on a semantic search, for example, performed by the semantic search engine 222 or based on the functionality performed by schema determiner 220.

As described herein, in one example, a data type 312 refers to a category or classification of the entries of data or of a portion of the data in the data set. In one embodiment, the data type 312 corresponds to one dimension of the data set. For example, the data type 312 includes a column label for records of a database. For a table of enterprise data, an example of a data type 312 includes a column labeled as "hours worked per week." It should be understood that the embodiments of the data types disclosed herein are not limited to a column semantics contained in tabular data structure, as the data types 312 can be determined for other data structures, such as arrays, stacks, queues, binary trees, graphs, tries, hash tables, and skip lists. In one embodiment, a new data type is generated, as discussed herein. In such embodiments, the schema 310 is updated as enriched schema that includes the new data type.

In one embodiment, the data type 312 is determined by detecting an entity in the initial prompt 320; based on the detected entity, performing a search operation of data that is stored in at least the data set to identify the data set; and determining the data set based on the result of the search operation.

Continuing with the schema 310, the data type relationships 314 includes an indication of a relationship between at least two data types 312. In one embodiment, the data type relationship 314 is determined by classifying at least a first dimension of the data set based on a semantic analysis of the data set to generate a classification, such as a parent-child relationship, a grouping classification, and so forth. In one embodiment, the relationship between the at least two data types 312 is based on a semantic analysis of the two data types 312. For example, a first data type indicative of weekly work hours for a first team is indicated as being related to a second data type indicative of daily work hours for a second team based on the semantic analysis. In one embodiment, the relationship between the at least two data types 312 is based on a semantic analysis of the at least two data types 312 and the initial prompt. For example, suppose an initial prompt includes a user query asking "is work-life balance getting better for my team." In this example, the data type relationship 314 would include an indication associating one or more dimensions (for example, columns of a table) with each other if the columns relate to "work" for "the user's team." In one embodiment, the data type relationship 314 includes a relationship determined between the first dimension and a second dimension of the data set and is stored in the existing schema 310 as enriched schema. In one embodiment, the data type relationship 314 is determined based on a semantic analysis performed on the data set, including the data types 312. In one embodiment, the semantic analysis is performed by the LLM 240 based on a prompt (from prompt generator 226 of FIG. 2). Alternatively or additionally, in one embodiment, the semantic analysis is performed by schema determiner 220.

Continuing with the schema 310, in one example, the categorical data 316 refers to a new data type that is generated based on existing data types and includes certain values or distributions for existing data types. In one embodiment, the categorical data 316 is generated by performing any suitable data manipulations, including an arithmetic operation, such as addition, subtraction, multiplication, division, calculating an average (or mean or median), matrix operations, and the like. In one embodiment, the categorical data 316 is generated by the data type determiner 224 generating a new data type (for example, a new data structure, such as a column, key-value pair, and so forth) comprising at least one of (1) a portion of the data set that is less than the entire data set or (2) an updated data type that comprises an arithmetic operation performed on the data set to reduce a size of the data set. In one embodiment, the new data type is added to the schema to generate an enriched schema.

Continuing with the schema 310, the data sample 318 refers to, in one example, an indication indicative of a previous initial prompt and a previous corresponding schema that were used to generate a target API call. In one embodiment, the data sample 318 includes one or more pairs of prior initial prompts and corresponding prior schema associated with the prior initial prompt. For example, the data sample 318 serves as a positive label of an initial prompt and schema that was used to generate a target API call. In one embodiment, the schema determiner 220 receives the data sample 318 and uses the data sample 318 as a positive label to determine a schema 310 (or aspect of the schema, such as data type 312) for a current initial prompt indicative of a user query.

In some embodiments, the initial prompt 320 includes a user query 322 that is included into a prompt space intended for processing by an LLM. In one example, "initial prompt" refers to the prompt directly received from the user and which is unaltered by the LLM interface layer 210. Optionally, in some embodiments, the initial prompt 320 includes a previous query 324. In one example, the previous query 324 includes a prior query submitted by the user. In one embodiment, the prior query 324 is accompanied by the prior corresponding schema, which is submitted as the initial prompt 320. In one example, the prior query 324 and/or corresponding schema is stored as the data sample 318.

In some embodiments, the initial prompt 320 is automatically generated and received by a workflow without a direct user input. For example, the initial prompt 320 can be periodically generated as part of a workflow including periodic prompts that are submitted to the LLM 240. In one embodiment, the initial prompt 320 is not communicated directly to the LLM 240 and is instead processed by the LLM interface layer 210 to generate one or more prompts, as discussed herein.

In some embodiments, an updated prompt 330 is generated based on the initial prompt 320 and the schema 310. In one embodiment, the LLM interface layer 210 receives the initial prompt 320, determines the schema 310, and generates the updated prompt 330 based on the initial prompt and schema 310. In one example, the "updated prompt" is alphanumeric characters including a first indication associated with the initial prompt 320 (including a user query 322 and/or a previous query 324) and a second indication associated with the schema 310 (including data types 312, data type relationships 314, categorical data 316, and data sample 318). In one embodiment, the updated prompt 330 includes an instruction directing the LLM 240 to generate a set of computer instructions. Example instructions include at least one instruction for processing the data in the data set responsive to the user query 322. As illustrated, additional data contained in the updated prompt 330 can include contextual information, such as the role of the user and a goal associated with the user query 322; general examples including queries and expected results (serving as positive labels for the LLM 240) and corresponding guidelines; detailed examples including a chain-of-thought; and rules and default guidelines associated with the initial prompt 320 and schema 310; among other data. In one embodiment, the updated prompt 330 is communicated (via prompt generator 226) to the LLM 240.

As illustrated, schematic flow diagram 300 includes generating an output 340. In one embodiment, the output 340 is generated by the LLM 240 or the API call generator 228 of FIG. 2. In one example, the output 340 corresponds to at least a portion of the response to the updated prompt 330 from the LLM 240. As illustrated, an example output 340 includes computer instructions, such as chat guidelines (including the steps performed by the LLM 240 for achieving the API call), API calls, or API parameters for generating an API call that are received from the LLM 240. In one embodiment, the generated API call is executed by a computing application operating at the client layer. Accordingly, embodiments of the computing application access and process at least a portion of the data, from the data set(s), according to the instructions of the API call. In some instances, executing the instructions causes the computing application to generate visual content, such as graphical representations of aspects of data, responsive to the user query.

Figure 4:
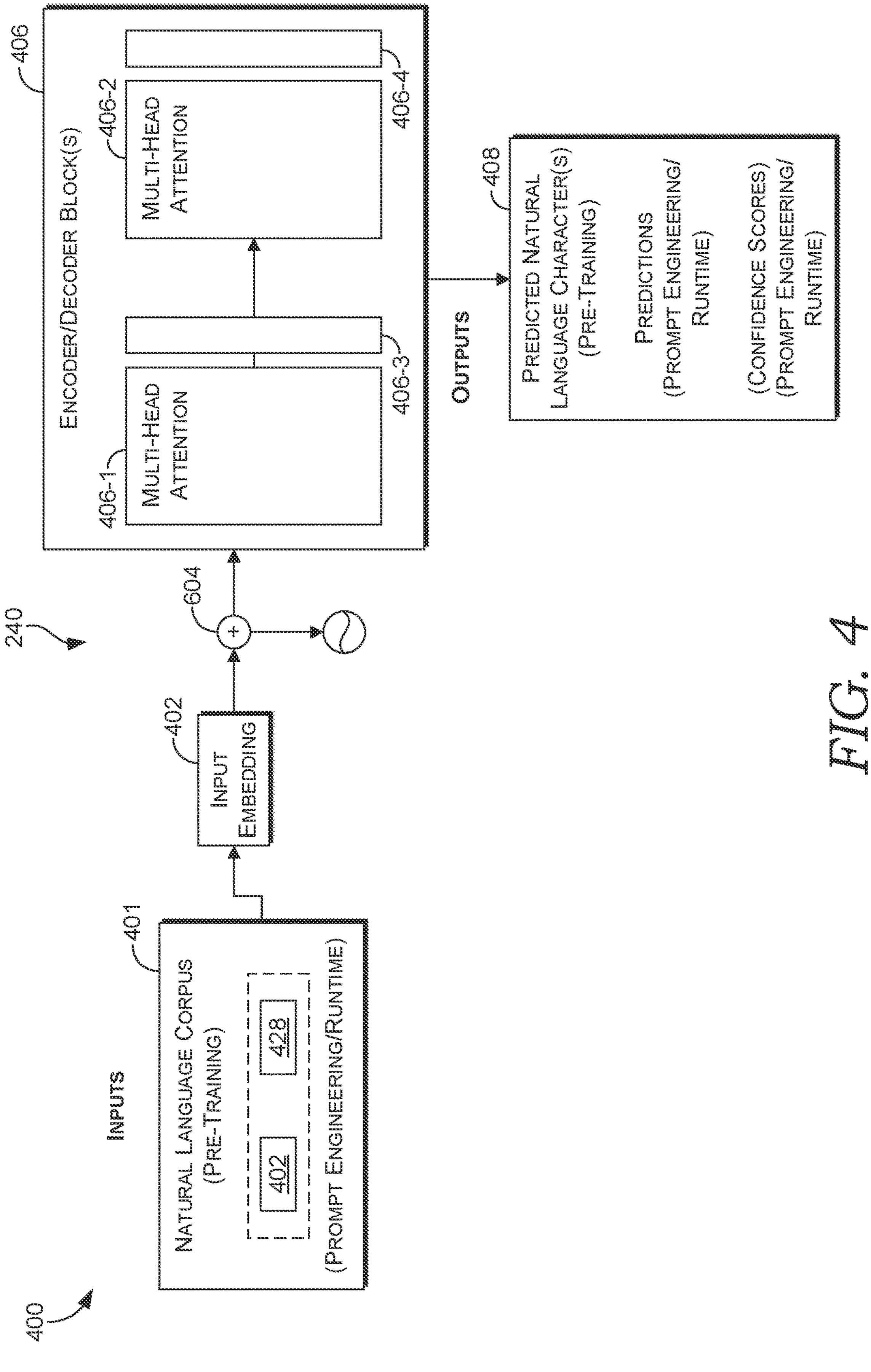
FIG. 4 is a block diagram of a language model that uses particular inputs to make particular predictions, in accordance with an embodiment of the present disclosure.

FIG. 4 is a block diagram of a language model 400 (for example, a BERT model or Generative Pre-Trained Transformer [GPT]-4 model) that uses particular inputs to make particular predictions (for example, answers to questions or generate computer instructions for generating an API call), according to some embodiments. In one embodiment, the language model 400 corresponds to the LLM 240 described herein. For example, this model 400 represents or includes the functionality as described with respect to the LLM 240 or the LLM interface layer 210 of FIG. 2 or 3. In various embodiments, the language model 400 includes one or more encoders and/or decoder blocks 406 (or any transformer or portion thereof).

First, a natural language corpus (for example, various WIKIPEDIA English words or BooksCorpus) of the inputs 401 are converted into tokens and then feature vectors and embedded into an input embedding 402 to derive meaning of individual natural language words (for example, English semantics) during pre-training. In some embodiments, to understand English language, corpus documents, such as text books, periodicals, blogs, social media feeds, and the like are ingested by the language model 400.

In some embodiments, each word or character in the input(s) 401 is mapped into the input embedding 402 in parallel or at the same time, unlike existing long short-term memory (LSTM) models, for example. The input embedding 402 maps a word to a feature vector representing the word. But the same word (for example, "apple") in different sentences may have different meanings (for example, the brand versus fruit). This is why a positional encoder 404 can be implemented. A positional encoder 404 is a vector that gives context to words (for example, "apple") based on a position of a word in a sentence. For example, with respect to a message "I just sent the document," because "I" is at the beginning of a sentence, embodiments can indicate a position in an embedding closer to "just," as opposed to "document." Some embodiments use a sine/cosine function to generate the positional encoder vector using the following two example equations:

$$PE_{(pos,2i)} = \sin\left(pos/10000^{2i/d_{model}}\right) \tag{1}$$

$$PE_{(pos,2i+1)} = \cos\left(pos/10000^{2i/d_{model}}\right). \tag{2}$$

After passing the input(s) 401 through the input embedding 402 and applying the positional encoder 404, the output is a word embedding feature vector, which encodes positional information or context based on the positional encoder 404. These word embedding feature vectors are then passed to the encoder and/or decoder block(s) 406, where it goes through a multi-head attention layer 406-1 and a feedforward layer 406-2. The multi-head attention layer 406-1 is generally responsible for focusing or processing certain parts of the feature vectors representing specific portions of the input(s) 401 by generating attention vectors. For example, in Question-Answering systems, the multi-head attention layer 406-1 determines how relevant the $i^{th}$ word (or particular word in a sentence) is for answering the question or relevance to other words in the same or other blocks, the output of which is an attention vector. For every word, some embodiments generate an attention vector, which captures contextual relationships between other words in the same sentence or other sequences of characters. For a given word, some embodiments compute a weighted average or otherwise aggregate attention vectors of other words that contain the given word (for example, other words in the same line or block) to compute a final attention vector.

In some embodiments, a single-headed attention has abstract vectors Q, K, and V that extract different components of a particular word. These are used to compute the attention vectors for every word, using the following equation (3):

$$Z = \text{softmax}\left(\frac{Q \cdot K^T}{\sqrt{\text{Dimension of vector } Q, K \text{ or } V}}\right) \cdot V. \tag{3}$$

For multi-headed attention, there are multiple weight matrices $W^q$, $W^k$, and $W^v$. so there are multiple attention vectors Z for every word. However, a neural network may expect one attention vector per word. Accordingly, another weighted matrix, $W^z$, is used to make sure the output is still an attention vector per word. In some embodiments, after the layers 406-1 and 406-2, a form of normalization (for example, batch normalization and/or layer normalization) is performed to smoothen out the loss surface, making it easier to optimize while using larger learning rates.

Layers 406-3 and 406-4 represent residual connection and/or normalization layers where normalization re-centers and rescales or normalizes the data across the feature dimensions. The feedforward layer 406-2 is a feedforward neural network that is applied to every one of the attention vectors outputted by the multi-head attention layer 406-1. The feedforward layer 406-2 transforms the attention vectors into a form that can be processed by the next encoder block or make a prediction at 408. For example, given that a document includes a first natural language sequence "the due date is . . . ," the encoder/decoder block(s) 406 predicts that the next natural language sequence will be a specific date or particular words based on past documents that include language identical or similar to the first natural language sequence.

In some embodiments, the encoder/decoder block(s) 406 includes pre-training to learn language (pre-training) and make corresponding predictions. In some embodiments, there is no fine-tuning because some embodiments perform prompt engineering or learning. Pre-training is performed to understand language, and fine-tuning is performed to learn a specific task, such as learning an answer to a set of questions (in Question-Answering [QA] systems).

In some embodiments, the encoder/decoder block(s) 406 learns what language and context for a word is in pre-training by training on two unsupervised tasks (Masked Language Model [MLM] and Next Sentence Prediction [NSP]) simultaneously or at the same time. In terms of the inputs and outputs, at pre-training, the natural language corpus of the inputs 401 may be various historical documents, such as text books, journals, and periodicals, in order to output the predicted natural language characters in 408 (not make the predictions at runtime or prompt engineering at this point). The example encoder/decoder block(s) 406 takes in a sentence, paragraph, or sequence (for example, included in the input[s] 401), with random words being replaced with masks. The goal is to output the value or meaning of the masked tokens. For example, if a line reads, "please [MASK] this document promptly," the prediction for the "mask" value is "send." This helps the encoder/decoder block(s) 406 understand the bidirectional context in a sentence, paragraph, or line in a document. In the case of NSP, the encoder/decoder block(s) 406 takes, as input, two or more elements, such as sentences, lines, or paragraphs, and determines, for example, if a second sentence in a document actually follows (for example, is directly below) a first sentence in the document. This helps the encoder/decoder block(s) 406 understand the context across all the elements of a document, not just within a single element. Using both of these together, the encoder/decoder block(s) 406 derives a good understanding of natural language.

In some embodiments, during pre-training, the input to the encoder/decoder block(s) 406 is a set (for example, two) of masked sentences (sentences for which there are one or more masks), which could alternatively be partial strings or paragraphs. In some embodiments, each word is represented as a token, and some of the tokens are masked. Each token is then converted into a word embedding (for example, 402). At the output side is the binary output for the next sentence prediction. For example, this component outputs 1, if masked sentence 2 follows (for example, is directly beneath) masked sentence 1. In one embodiment, the outputs are word feature vectors that correspond to the outputs for the machine learning model functionality. Thus, the number of word feature vectors that are input is the same number of word feature vectors that are output.

In some embodiments, the initial embedding (for example, the input embedding 402) is constructed from three vectors: the token embeddings, the segment or context-question embeddings, and the position embeddings. In some embodiments, the following functionality occurs in the pre-training phase. The token embeddings are the pre-trained embeddings. The segment embeddings are the sentence numbers (that includes the input[s] 401) that is encoded into a vector (for example, first sentence, second sentence, and so forth, assuming a top-down and right-to-left approach). The position embeddings are vectors that represent the position of a particular word in such a sentence that can be produced by positional encoder 404. In embodiments where these three embeddings are added or concatenated together, an embedding vector is generated that is used as input into the encoder/decoder block(s) 406. The segment and position embeddings are used for temporal ordering since all of the vectors are fed into the encoder/decoder block(s) 406 simultaneously, and language models need some sort of order preserved.

In pre-training, the output is typically a binary value C (for NSP) and various word vectors (for MLM). With training, a loss (for example, cross-entropy loss) is minimized. In some embodiments, all the feature vectors are of the same size and are generated simultaneously. As such, each word vector can be passed to a fully connected layered output with the same number of neurons equal to the same number of tokens in the vocabulary.

In some embodiments, after pre-training is performed, the encoder/decoder block(s) 406 performs prompt engineering or fine-tuning on a variety of QA data sets by converting different QA formats into a unified sequence-to-sequence format. For example, some embodiments perform the QA task by adding a new question-answering head or encoder/decoder block, just the way a masked language model head is added (in pre-training) for performing an MLM task, except that the task is a part of prompt engineering or fine-tuning. This includes the encoder/decoder block(s) 406 processing the inputs 402 and/or 428 (for example, the initial prompt 320, including the user query 322 or the previous queries 324, and/or the schema 310 including data types 312, data type relationships 314, categorical data 316, or data sample 318) in order to make the predictions and generate a prompt response, as indicated in 404. Prompt engineering, in some embodiments, is the process of crafting and optimizing text prompts for language models to achieve desired outputs. In other words, prompt engineering comprises a process of mapping prompts (for example, a question) to the output (for example, an answer) that it belongs to for training. For example, if a user asks a model to generate a poem about a person fishing on a lake, the expectation is it will generate a different poem each time. Users may then label the output or answers from best to worst. These labels can correspond to the previous queries 324 of FIG. 3 or the data sample 318 of FIG. 3. Such labels are an input to the model to make sure the model is giving more human-like or best answers, while trying to minimize the worst answers (for example, via reinforcement learning).

In some embodiments, the inputs 401 additionally or alternatively include other inputs, such as the inputs to the LLM 240 described in FIGS. 2 and 3. In an illustrative example, in some embodiments, the predictions of the output 406 represent an API, API parameters, an API call, and/or chart guidelines generated based on the schema 310 and the initial prompt 320. For instance, the predictions are generative text, such as a generative answer to a question, machine translation text, or other generative text, such as text associated with the API, API parameters, or an API call. Alternative to prompt engineering, certain embodiments of inputs 402 and/or 428 (or the inputs or prompts sent to or received by the LLM 240 described in FIGS. 2 and 3) represent inputs provided to the encoder/decoder block(s) 408 at runtime or after the model 400 has been trained, tested, and deployed. Likewise, in these embodiments, the predictions in the output 408 represent predictions made at runtime or after the model 400 has been trained, tested, and deployed.

Figure 5A:
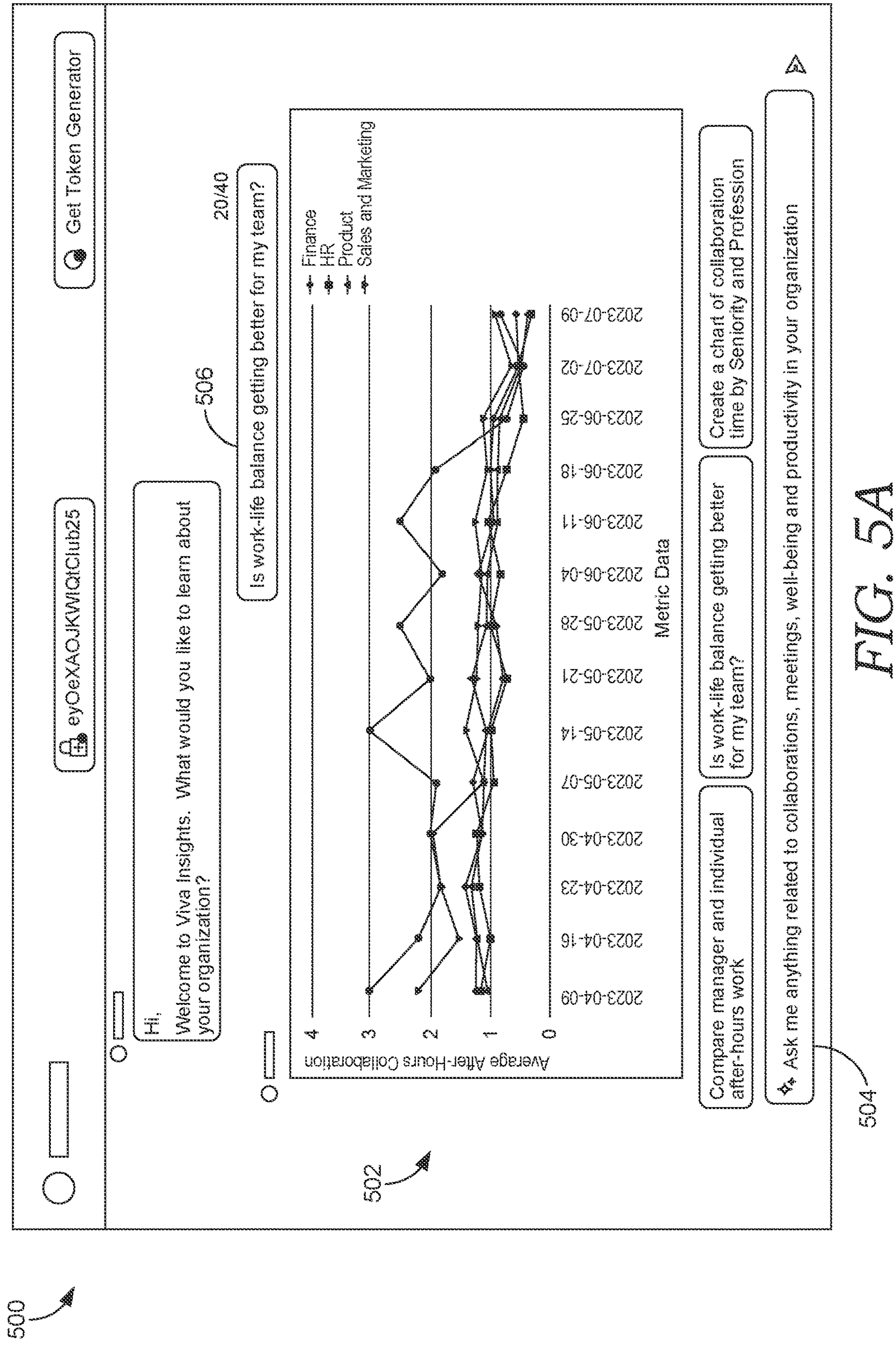
FIG. 5A is a first example interface of visual content generated based on an API call and schema generated and managed by an LLM interface layer, in accordance with an embodiment of the present disclosure.
Figure 5B:
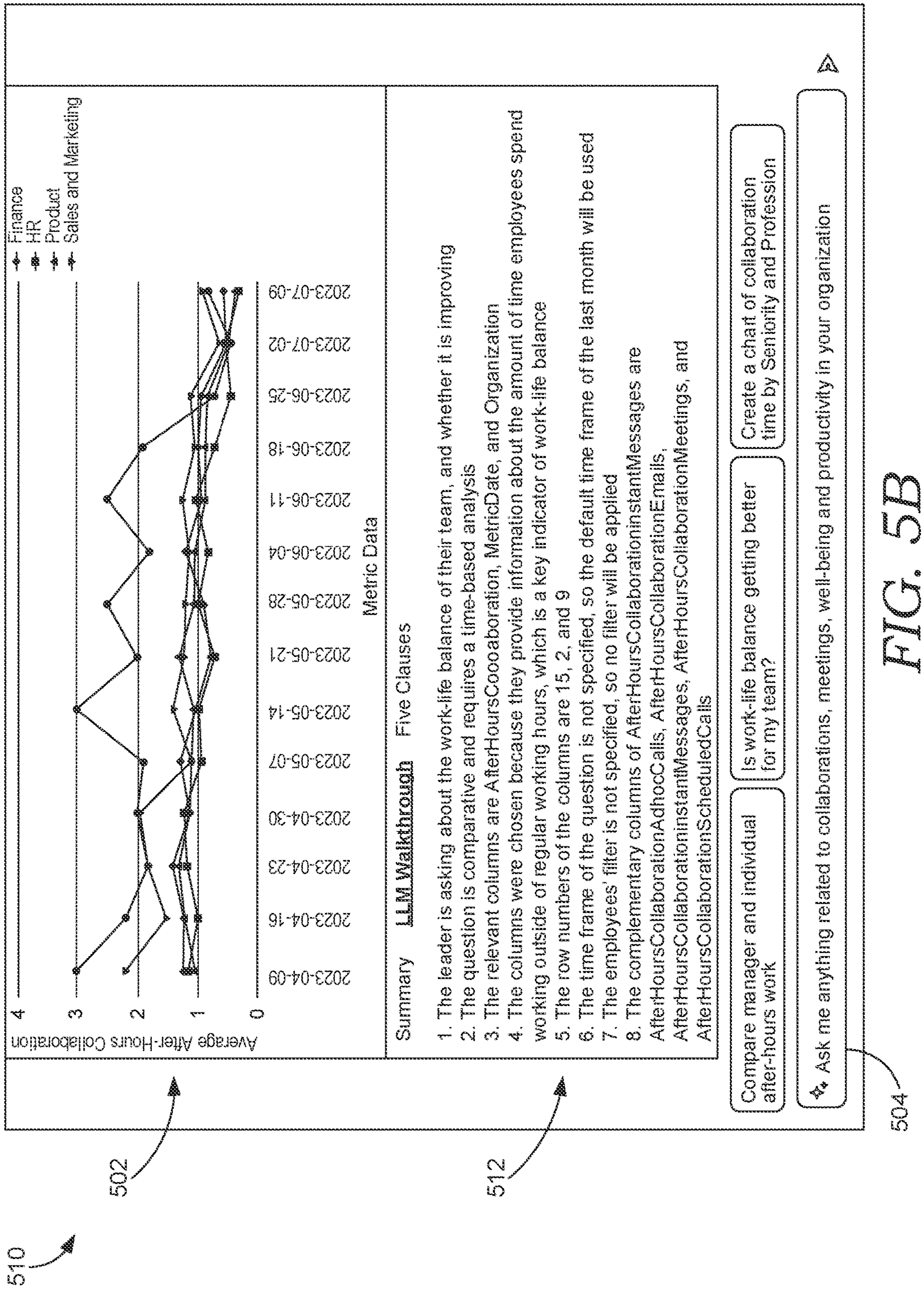
FIG. 5B is a second example interface of visual content generated based on an API call and schema generated and managed by an LLM interface layer, in accordance with an embodiment of the present disclosure.

FIG. 5A is a first example interface 500 of visual content 502 generated based on an API call and schema generated or managed by an LLM interface layer 210 of FIG. 2, in accordance with an embodiment of the present disclosure. Scrolling down on the first example interface 500 renders a second example interface 510 of FIG. 5B. As illustrated, the visual content 502 includes a time graph of average after-hours collaboration for each of a number of teams, such as the finance team, the HR team, the product team, and the sales and marketing team, to name a few. In one embodiment, the visual content 502 is generated based on an API call generated by the LLM 240 (FIG. 2) based on the schema 310 (FIG. 2) determined by the LLM interface layer 210 and based on the initial prompt 320 (FIG. 3).

As illustrated, the second example interface 510 includes a summary, a LLM walkthrough, or five clauses information. In one example, the summary, the LLM walkthrough, or the five clauses information is generated based on another API call. For example, after the data is retrieved from the API and/or the visual content is initiated/generated, in one embodiment, the LLM interface layer (or the LLM) cause a second API call to be generated. For example, the second API call is generated to cause a response to be generated for the initial prompt. In this example, where the user query asked "is [the work-life balance] improving," the second API call causes a response to be generated based on the visual content generated. In this example, the response includes a string of alphanumeric characters summarizing an aspect of the visual content generated by the first API call. For example, in response to the second API call, a response includes "work life balance has improved for your team, whose average after-hours collaboration has drop to under 1 hour, which is similar to that of other teams in your organization, such as the Product, HR, and Marketing Team."

As illustrated, in addition to the visual content 502, the second example interface 510 includes an LLM walkthrough 512 showing all the steps performed by the LLM 240 or the LLM interface layer 210 in the analysis. In this manner, a user can better determine which, if any step, could be the cause of a hallucination by the LLM 240, thereby providing a method for diagnosing an output from the LLM 240 and LLM interface layer 210.

By way of non-limiting example and alternative to the steps shown in the LLM walkthrough 512, suppose the LLM interface layer 210 receives an input comprising an initial query intended for LLM 240 that is indicative of generating visual content. For example and as illustrated, suppose a user submits, into a prompt space 504, a user query 506 "is work-life balance getting better for my team." Based on this user query 506, embodiments of the LLM interface layer 210 determine a data set for responding to this user query. For example, determining the data set for responding to this user query includes extracting from the user query an intent and a task. In this example, the intent is "determine work-life balance for my team," and the task is "search a productivity application for work-life balance data for a team of the user and display as a visual."

In one embodiment, the LLM interface layer 210 performs a semantic search to identify data types 312 in the data set that are related to the user query 322, the intent, or the task. In one embodiment, the LLM interface layer 210 performs the semantic search to identifying the data type 312 by prompting the LLM 240 to identify data types 312 in the data set that are within a semantic vector space to the user query 322, the intent, or the task. Continuing this example, the LLM interface layer 210 determines (or receives from the LLM 240 an indication) that the data set includes data types, such as "hours worked per week," "vacation hours taken this year," "Finance Team," and other related data types.

In one embodiment, an LLM interface layer 210 generates or determines a schema 310 (FIG. 3) associated with the data set or the data type 312. Continuing this example, the LLM interface layer 210 determines from the relevant data types (in this example, "hours worked per day," "vacation hours taken this year," or "Finance Team"), or other aspects of a schema. In one embodiment, determining the data type comprises generating a new data structure comprising at least one of (1) a portion of the data set that is less than the entire data set or (2) an updated data type that comprises an arithmetic operation performed on the data set to reduce the size of the data set. Continuing the example where a user query includes: "is work-life balance getting better for my team," determining the data type includes determining that no metadata or column description exists for "work-life balance," based on the schema. However, the LLM interface layer 210 or the LLM 240 can determine that the most semantically related columns or metadata are the data types labeled as "hours worked per day," "vacation hours taken this year," and "Finance Team." In this example, the LLM interface layer performs an arithmetic calculation, such as adding the entries in "hours worked per day" during each 7-day interval to generate a new data type (for example, column) of "hours worked per week," and accesses this new data type to respond to the query. Furthermore, in this example, the LLM interface layer (or the LLM) identifies the "hours worked per week" for each member of the various teams and performs another arithmetic calculation, such as averaging the "hours worked per week" across the "Finance Team," which is the team that the user is a part of. Thereafter, the "average after-hours collaboration" can be computed by determining the hours per week exceeding 40 hours. Accordingly, in one embodiment, the schema is updated to include a data type containing at least one entry of enriched schema (in this example, the new data structure indicative of "hours worked per week" or "average after-hours collaboration" for each team, such as the "Finance team") that is not included in the initial data set.

Embodiments of the technology described herein include generating, for the LLM 240, a prompt including (1) an aspect of the initial prompt 320, (2) an aspect of the schema 310, and/or (3) an instruction directing the LLM 240 to generate a set of computer instructions, comprising at least one instruction for processing the data in the data set responsive to the user query 322. Continuing the example above, the LLM interface layer 210 generates a prompt including the task associated with the user query 322 (in this example, "search a productivity application for work-life balance data for a team of the user and display as a visual," which corresponds to [1] an aspect of the initial prompt 320), the rows and columns that contain the relevant data (which in this example correspond to [2] an aspect of the schema 310), an indication of the new data structure (in this example, "hours worked per week" for each team, such as the "Finance Team," which corresponds to [3] an aspect of the data type).

In response to the prompt, embodiments of the technology described herein include receiving an API call or API parameters for generating an API call that accesses at least a portion of the schema to produce visual content. In one embodiment, the LLM interface layer 210 receives the API and API parameters to generate an API call or receives the API call from the LLM 240 and passes the API call to the associated endpoint. In one embodiment, the API call is generated based on the above-mentioned prompt or based on an output from the LLM. Based on the API call, an endpoint can generate the visual content that includes the "average after-hours collaboration" overtime for each team, such as the "Finance Team." Other visual content can also be generated other than the time graph of FIGS. 5A and 5B.

Figure 6:
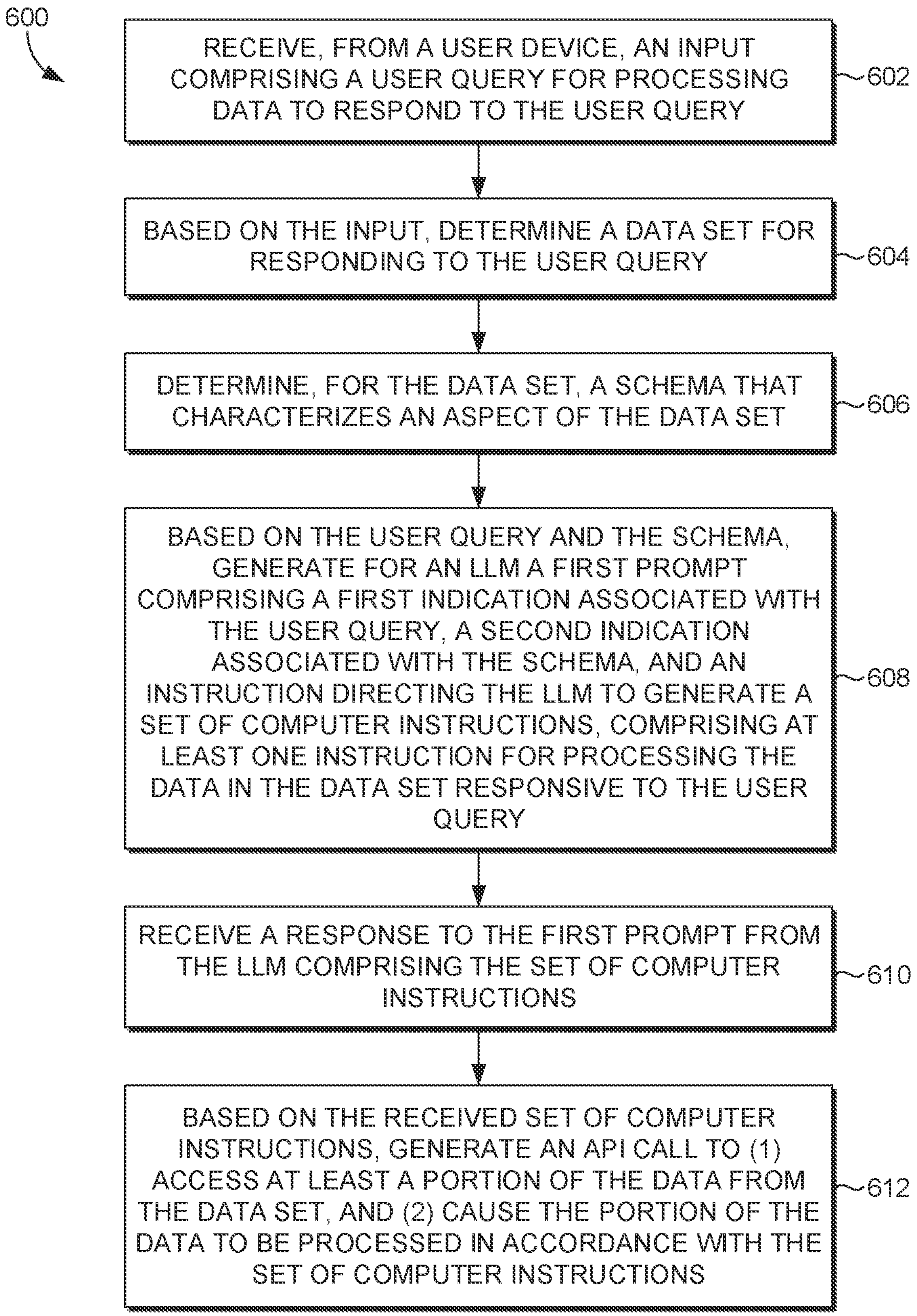
FIG. 6 depicts a flow diagram of a method for generating an API call to access at least a portion of data and cause the portion of data to be processed based on computer instructions, in accordance with an embodiment of the present disclosure.
Figure 7:
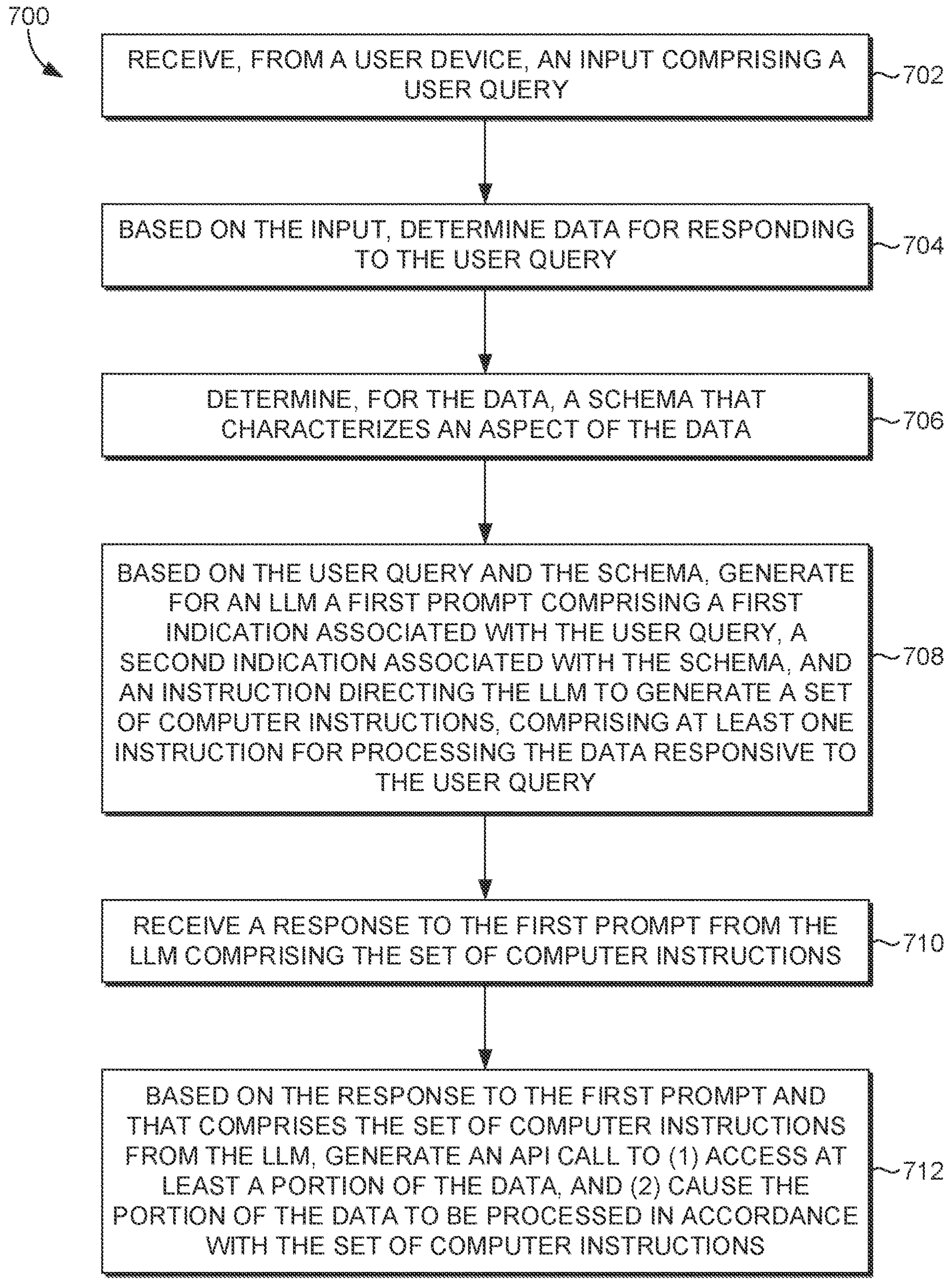
FIG. 7 depicts a flow diagram of a method for causing an API call to be generated based on a response to the first prompt and that comprises the set of computer instructions from an LLM, in accordance with an embodiment of the present disclosure.
Figure 8:
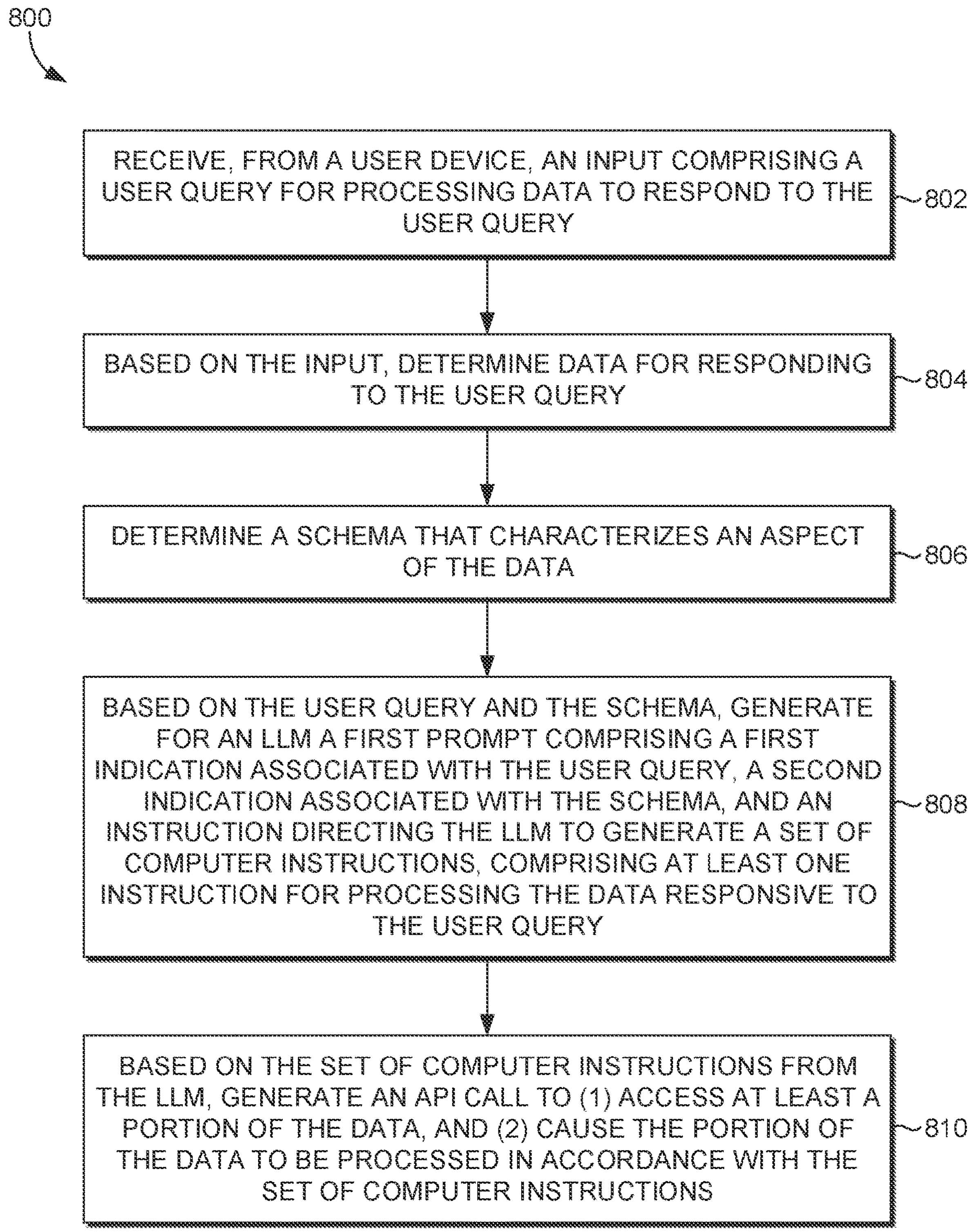
FIG. 8 depicts a flow diagram of a method for generating an API call based on the set of computer instructions from the LLM, in accordance with an embodiment of the present disclosure.

Turning now to FIGS. 6, 7, and 8, aspects of example process flows 600, 700, and 800 are illustratively depicted for some embodiments of the disclosure. Embodiments of process flows 600, 700, and 800 each comprise a method (sometimes referred to herein as method 600, 700, and 800) carried out to implement various example embodiments described herein. For instance, at least one of process flow 600, 700, and 800 is performed to programmatically generate, for a target communication item, a contextual title, which is used to provide any of the improved electronic communications technology or enhanced user computing experiences described herein.

Each block or step of process flow 600, process flow 700, process flow 800, and other methods described herein comprises a computing process performed using any combination of hardware, firmware, and/or software. For instance, various functions are carried out by a processor executing instructions stored in memory, such as memory 1012, as described in FIG. 10. Embodiments of the methods can also be embodied as computer-usable instructions stored on computer storage media. Embodiments of the methods are provided by a standalone application, a service or hosted service (standalone or in combination with another hosted service), or a plug-in to another product, to name a few. For example, the blocks of process flow 600, 700, and 800 that correspond to actions (or steps) to be performed (as opposed to information to be processed or acted on) are carried out by one or more computing applications or services, in some embodiments, which operate on one or more user devices (such as user devices 102*a* and 102*b* through 102*n* of FIG. 1), and/or are distributed across multiple user devices, and/or servers, or by a distributed computing platform, and/or are implemented in the cloud, such as is described in connection with FIG. 11. In some embodiments, the functions performed by the blocks or steps of process flows 700, 800, and 900 are carried out by components of system 200, as described in FIG. 2.

FIG. 6 depicts a flow diagram of a process 600 for generating an API call to access at least schema and to produce a visual content based on a user query and visualization guidelines, in accordance with an embodiment of the present disclosure. At block 602, process 600 includes receiving, from a user device, an input comprising a user query for processing data to respond to the user query. At block 604, process 600 includes determining a data set for responding to the user query based on the input. At block 606, process 600 includes determining, for the data set, a schema that characterizes an aspect of the data set. At block 608, process 600 includes generating for an LLM, based on the user query and the schema, a first prompt comprising a first indication associated with the user query, a second indication associated with the schema, and an instruction directing the LLM to generate a set of computer instructions. The set of computer instructions includes at least one instruction for processing the data in the data set responsive to the user query. At block 610, process 600 includes receiving a response to the first prompt from the LLM comprising the set of computer instructions. At block 612, process 600 includes generating, based on the received set of computer instructions, an API call to (1) access at least a portion of the data from the data set, and (2) cause the portion of the data to be processed in accordance with the set of computer instructions.

Turning to FIG. 7, depicted is a flow diagram of a method 700 for causing an API call to be generated based on a response to the first prompt and that comprises the set of computer instructions from the LLM, in accordance with an embodiment of the present disclosure. At block 702, process 700 includes receiving, from a user device, an input comprising a user query. At block 704, process 700 includes determining, based on the input, data for responding to the user query. At block 706, process 700 includes determining, for the data, a schema that characterizes an aspect of the data. At block 708, process 700 includes generating for an LLM, based on the user query and the schema, a first prompt comprising a first indication associated with the user query, a second indication associated with the schema, and an instruction directing the LLM to generate a set of computer instructions, comprising at least one instruction for processing the data responsive to the user query. At block 710, process 700 includes receiving a response to the first prompt from the LLM comprising the set of computer instructions. At block 712, process 700 includes, based on a response to the first prompt and that comprises the set of computer instructions from the LLM, generating an API call to (1) access at least a portion of the data and (2) cause the portion of the data to be processed in accordance with the set of computer instructions.

FIG. 8 depicts a flow diagram of a method 800 for generating an API call based on the set of computer instructions from the LLM, in accordance with an embodiment of the present disclosure. At block 802, process 800 includes receiving, from a user device, an input comprising a user query for processing data to respond to the user query. At block 804, process 800 includes determining, based on the input, data for responding to the user query. At block 806, process 800 includes determining a schema that characterizes an aspect of the data. At block 808, process 800 includes, based on the user query and the schema, generating for an LLM a first prompt comprising a first indication associated with the user query, a second indication associated with the schema, and an instruction directing the LLM to generate a set of computer instructions, comprising at least one instruction for processing the data responsive to the user query. At block 810, process 800 includes generating, based on the set of computer instructions from the LLM, an API call to (1) access at least a portion of the data from the data and (2) cause the portion of the data to be processed in accordance with the set of computer instructions.

Other Embodiments

In some embodiments, a system, such as the computerized system described in any of the embodiments above, comprises at least one computer processor and computer storage media storing computer-useable instructions that, when used by the at least one computer processor, cause the system to perform operations. The operations comprise receiving, from a user device, an input comprising a user query. The operations comprise based on the input, determining a data set for responding to the user query. The operations comprise determining, for the data set, a schema that characterizes an aspect of the data set. The operations comprise based on the user query and the schema, generating for a Large Language Model (LLM) a first prompt comprising a first indication associated with the user query, a second indication associated with the schema, and an instruction directing the LLM to generate a set of computer instructions that include at least one instruction for processing the data in the data set responsive to the user query. The operations comprise receiving a response to the first prompt from the LLM comprising the set of computer instructions. The operations comprise based on the received set of computer instructions, generating an Application Programming Interface (API) call to (1) access at least a portion of the data from the data set; and (2) cause the portion of the data to be processed in accordance with the set of computer instructions.

In any combination of the above embodiments of the system, the aspect of the data set characterized by the schema comprises at least one of: metadata associated with the data set, an arrangement of the data in the data set, a data type of the data in the data set, or a new data type for new data that is not included in the data set and is determinable from at least a portion of the data in the data set.

In any combination of the above embodiments of the system, at least part of the schema is predetermined, or wherein the schema is determined based on at least a sample of the data in the data set, metadata associated with the data set, or an arrangement of the data in the data set.

In any combination of the above embodiments of the system, the data set comprises data arranged in a tabular format, graph, vector, list, index, catalog, or key-value pair. Determining the schema comprises at least one of: classifying at least a first dimension of the data set based on a semantic analysis of the data set to generate a classification; determining a relationship between the first dimension and a second dimension of the data set; or determining a description of the classification of the first dimension and the relationship between the first dimension and the second dimension.

In any combination of the above embodiments of the system, the operations further comprise generating, based on the schema and the user query, a second prompt to the LLM comprising an indication associated with the schema and an instruction to determine a description of semantic data corresponding to at least the portion of the data in the data set. The operations further comprise receiving, from the LLM, the description of the semantic data. The operations further comprise updating the schema to include the description of the semantic data. The description of the semantic data includes at least one of: a first description for determining a new data from a first data in the data set, the new data related to the user query; or an indication of a data type for the first data in the data set, the data type related to the user query.

In any combination of the above embodiments of the system, the generated first prompt further comprises a third indication indicative of a category for a visual representation of the processed data. The category for the visual representation comprises at least one of: a graph, a chart, a table, or a diagram, and wherein the at least one computer instruction in the set of computer instructions specifies generating the visual representation.

In any combination of the above embodiments of the system, the operations further comprise communicating, to an endpoint of a productivity application and via an Application Programming Interface (API) of the productivity application, the API call. Communicating the API call causes the productivity application to generate visual content that is a visual representation of the processed portion of data.

In any combination of the above embodiments of the system, determining the data set comprises: detecting an entity in the user query; and based on the detected entity, performing a search operation against stored data, wherein the data set is determined based on a result of the search operation.

In any combination of the above embodiments of the system, determining the data set comprises: determining, from the input, an intent; determining, from the intent or from the input, a task; communicating a first indication of the intent or the task to the LLM as a first communication; based on the first communication, receiving an initial response from the LLM to the first communication; and based on the initial response from the LLM not being near the intent or the task, in semantic vector space, communicating a second indication of the intent, the task, and the initial response until a subsequent response from the LLM is near the intent or the task in the semantic vector space. The semantic vector space is indicative of semantic similarity between one or more words or phrases.

In any combination of the above embodiments of the system, the operations further comprise providing an indication of the user query to the LLM and receiving at least one of: an indication of an intent associated with the user query or a task associated with the user query.

Various embodiments are directed to computer-implemented method comprising receiving, from a user device, an input comprising a user query. The computer-implemented method comprises, based on the input, determining data for responding to the user query. The computer-implemented method comprises determining, for the data, a schema that characterizes an aspect of the data. The computer-implemented method comprises, based on the user query and the schema, generating for a Large Language Model (LLM) a first prompt comprising a first indication associated with the user query, a second indication associated with the schema, and an instruction directing the LLM to generate a set of computer instructions. The set of computer instructions comprises at least one instruction for processing the data responsive to the user query. The computer-implemented method comprises receiving a response to the first prompt from the LLM comprising the set of computer instructions. The computer-implemented method comprises, based on a response to the first prompt and that comprises the set of computer instructions from the LLM, generating an Application Programming interface (API) call to (1) access at least a portion of the data and (2) cause the portion of the data to be processed in accordance with the set of computer instructions.

In any combination of the above embodiments of the computer-implemented method, the input comprises the user query intended for the LLM from the user device is not communicated directly to the LLM.

In any combination of the above embodiments of the computer-implemented method, determining a data type related to the user query comprises: identifying a plurality of data types related to the user query. The plurality of data types have a first level of relatedness to the user query based on a semantic analysis. The computer-implemented method comprises performing an operation on the plurality of data types to generate a new data type. The new data type has a second level of relatedness to the user query, such that the second level of relatedness is higher than the first level of relatedness, and such that the data type comprises the new data type.

In any combination of the above embodiments of the computer-implemented method, the generated first prompt further comprises a third indication indicative of a category for a visual representation of the processed data. The category for the visual representation comprises at least one of: a graph, a chart, a table, or a diagram. The at least one computer instruction in the set of computer instructions specifies generating the visual representation.

In any combination of the above embodiments of the computer-implemented method, the computer-implemented method further comprises transmitting, to an endpoint of a productivity application and via an API of the productivity application, the API call. Transmitting the API call causes the productivity application to generate visual content that is a visual representation of the processed portion of data.

In any combination of the above embodiments of the computer-implemented method, the data is arranged in a tabular format, graph, vector, list, index, catalog, or key-value pair. Determining the schema comprises at least one of: classifying at least a first dimension of the data based on a semantic analysis of the data to generate a classification; determining a relationship between the first dimension and a second dimension of the data; or determining a description of the classification of the first dimension and the relationship between the first dimension and the second dimension.

Various embodiments are directed to one or more computer storage media having computer-executable instructions embodied thereon that, when executed, by one or more processors, cause the one or more processors to perform operations. The operations include receiving, from a user device, an input comprising a user query for processing data to respond to the user query. The operations include, based on the input, determining data for responding to the user query. The operations include determining a schema that characterizes an aspect of the data. The operations include, based on the user query and the schema, generating for a Large Language Model (LLM) a first prompt comprising a first indication associated with the user query, a second indication associated with the schema, and an instruction directing the LLM to generate a set of computer instructions. The set of computer instructions comprising at least one instruction for processing the data responsive to the user query. The operations include, based on the set of computer instructions from the LLM, generating an Application Programming Interface (API) call to (1) access at least a portion of the data from the data and (2) cause the portion of the data to be processed in accordance with the set of computer instructions.

In any combination of the above embodiments of the one or more computer storage media, the operations further comprise providing the first prompt to the LLM; and receiving, from the LLM and in response to the first prompt, a response based on the set of computer instructions.

In any combination of the above embodiments of the one or more computer storage media, determining the schema comprises at least one of: classifying at least a first dimension of the data based on a semantic analysis of the data to generate a classification; determining a relationship between the first dimension and a second dimension of the data; or determining a description of the classification of the first dimension and the relationship between the first dimension and the second dimension.

In any combination of the above embodiments of the one or more computer storage media, the operations further comprise, based on the schema and the user query, generating a second prompt to the LLM comprising an indication associated with the schema and an instruction to determine a description of semantic data corresponding to at least the portion of the data. The operations further comprise receiving, from the LLM, the description of the semantic data; and updating the schema to include the description of the semantic data. The description of the semantic data includes at least one of: a first description for determining a new data from a first data in the data, the new data related to the user query; or an indication of a data type for the first data in the data, the data type related to the user query.

Example Computing Environments

Figure 9:
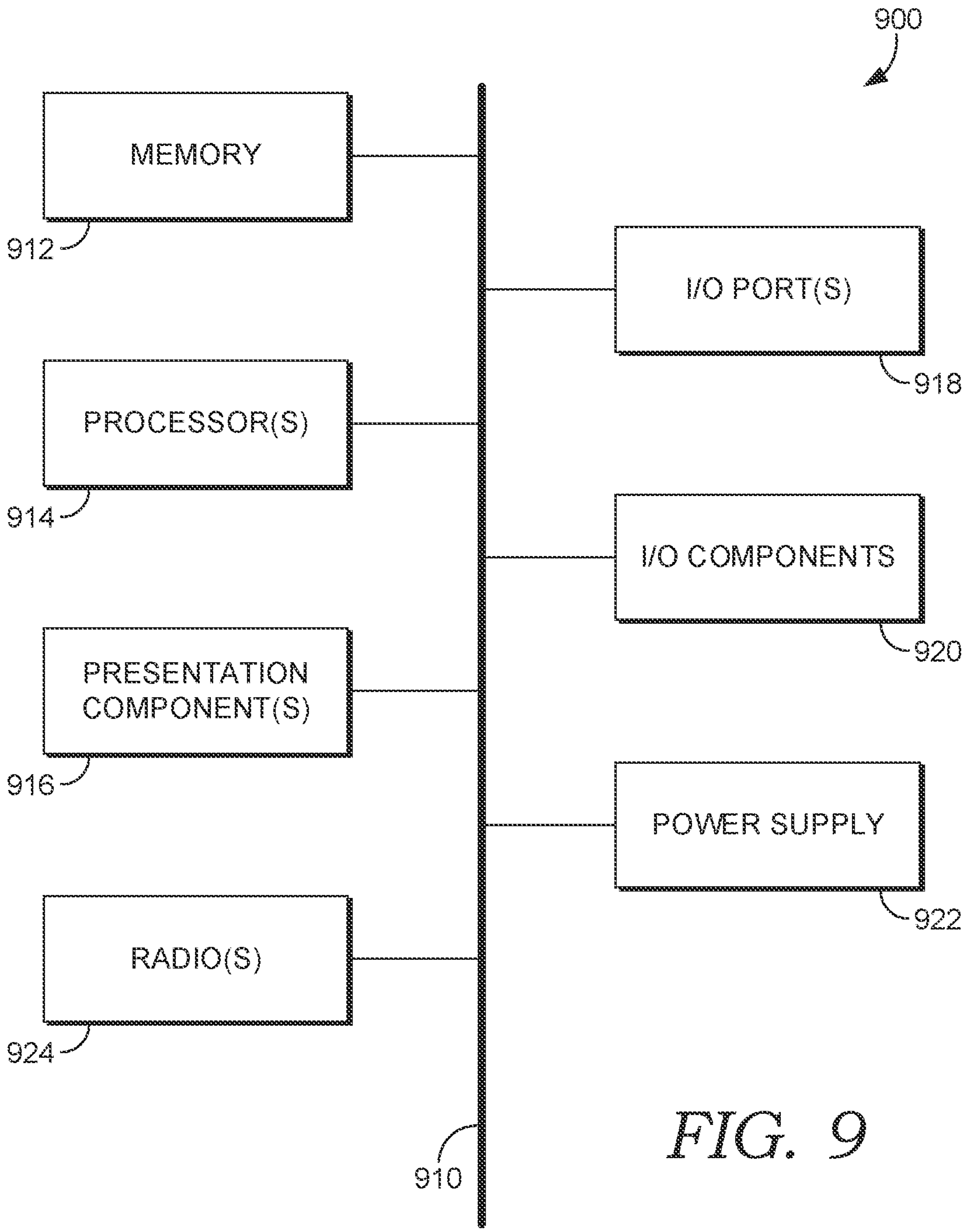
FIG. 9 is a block diagram of an example computing environment suitable for use in implementing an embodiment of the present disclosure.

Having described various implementations, several example computing environments suitable for implementing embodiments of the disclosure are now described, including an example computing device and an example distributed computing environment in FIGS. 9 and 10, respectively. With reference to FIG. 9, an example computing device is provided and referred to generally as computing device 900. The computing device 900 is but one example of a suitable computing environment and is not intended to suggest any limitation as to the scope of use or functionality of embodiments of the disclosure, and nor should the computing device 900 be interpreted as having any dependency or requirement relating to any one or combination of components illustrated.

Embodiments of the disclosure are described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure are practiced in a variety of system configurations, including mobile devices, consumer electronics, general-purpose computers, more specialty computing devices, or the like. Embodiments of the disclosure are also practiced in distributed computing environments where tasks are performed by remote-processing devices that are linked through a communications network. In a distributed computing environment, program modules may be located in both local and remote computer storage media, including memory storage devices.

Some embodiments comprise an end-to-end software-based system that operates within system components described herein to operate computer hardware to provide system functionality. At a low level, hardware processors generally execute instructions selected from a machine language (also referred to as machine code or native) instruction set for a given processor. The processor recognizes the native instructions and performs corresponding low-level functions related to, for example, logic, control, and memory operations. Low-level software written in machine code can provide more complex functionality to higher level software. Accordingly, in some embodiments, computer-executable instructions include any software, including low-level software written in machine code, higher level software such as application software, and any combination thereof. In this regard, the system components can manage resources and provide services for system functionality. Any other variations and combinations thereof are contemplated within the embodiments of the present disclosure.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. In one example, bus 910 represents one or more buses (such as an address bus, data bus, or combination thereof). Although the various blocks of FIG. 9 are shown with lines for the sake of clarity, in reality, these blocks represent logical, not necessarily actual, components. For example, a presentation component includes a display device, such as an I/O component. Also, processors have memory. This disclosure recognizes that such is the nature of the art and reiterate that the diagram of FIG. 9 is merely illustrative of an example computing device that can be used in connection with one or more embodiments of the present disclosure. Distinction is not made between such categories as "workstation," "server," "laptop," or "handheld device," as all are contemplated within the scope of FIG. 9 and with reference to "computing device."

Computing device 900 typically includes a variety of computer-readable media. Computer-readable media can be any available media that can be accessed by computing device 900 and includes both volatile and non-volatile, removable and non-removable media. By way of example, and not limitation, computer-readable media comprises computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 912 includes computer storage media in the form of volatile and/or non-volatile memory. In one example, the memory is removable, non-removable, or a combination thereof. Hardware devices include, for example, solid-state memory, hard drives, and optical-disc drives. Computing device 900 includes one or more processors 914 that read data from various entities such as memory 912 or I/O components 920. As used herein and in one example, the term processor or "a processer" refers to more than one computer processor. For example, the term processor (or "a processor") refers to at least one processor, which is a physical or virtual processor, such as a computer processor on a virtual machine. In one example, the term processor (or "a processor") refers to a plurality of processors, each of which is physical or virtual, such as a multiprocessor system, distributed processing or distributed computing architecture, cloud computing system, or parallel processing by more than a single processor. Further, various operations described herein as being executed or performed by a processor are performed by more than one processor.

Presentation component(s) 916 presents data indications to a user or other device. Presentation components include, for example, a display device, speaker, printing component, vibrating component, and the like.

The I/O ports 918 allow computing device 900 to be logically coupled to other devices, including I/O components 920, some of which are built-in. Illustrative components include a microphone, joystick, game pad, satellite dish, scanner, printer, or a wireless device. The I/O components 920 can provide a natural user interface (NUI) that processes air gestures, voice, or other physiological inputs generated by a user. In some instances, inputs are transmitted to an appropriate network element for further processing. An NUI can implement any combination of speech recognition, touch and stylus recognition, facial recognition, biometric recognition, gesture recognition both on screen and adjacent to the screen, air gestures, head and eye tracking, and touch recognition associated with displays on the computing device 900. In one example, the computing device 900 is equipped with depth cameras, such as stereoscopic camera systems, infrared camera systems, red-green-blue (RGB) camera systems, and combinations of these, for gesture detection and recognition. Additionally, an example computing device 900 is equipped with accelerometers or gyroscopes that enable detection of motion. The output of the accelerometers or gyroscopes may be provided to the display of the computing device 900 to render immersive augmented reality or virtual reality.

Some embodiments of computing device 900 include one or more radio(s) 924 (or similar wireless communication components). The radio transmits and receives radio or wireless communications. Example computing device 900 is a wireless terminal adapted to receive communications and media over various wireless networks. Example computing device 900 communicates via wireless protocols, such as code-division multiple access ("CDMA"), Global System for Mobile ("GSM") communication, or time-division multiple access ("TDMA"), as well as others, to communicate with other devices. In one embodiment, the radio communication is a short-range connection, a long-range connection, or a combination of both a short-range and a long-range wireless telecommunications connection. When this disclosure refers to "short" and "long" types of connections, this disclosure do not mean to refer to the spatial relation between two devices. Instead, this disclosure are generally referring to short range and long range as different categories, or types, of connections (for example, a primary connection and a secondary connection). A short-range connection includes, by way of example and not limitation, a Wi-Fi® connection to a device (for example, mobile hotspot) that provides access to a wireless communications network, such as a wireless local area network (WLAN) connection using the 802.11 protocol; a Bluetooth connection to another computing device is a second example of a short-range connection, or a near-field communication connection. A long-range connection may include a connection using, by way of example and not limitation, one or more of Code-Division Multiple Access (CDMA), General Packet Radio Service (GPRS), Global System for Mobile Communication (GSM), Time-Division Multiple Access (TDMA), and 802.16 protocols.

Referring now to FIG. 10, an example distributed computing environment 1000 is illustratively provided, in which implementations of the present disclosure can be employed. In particular, FIG. 10 shows a high-level architecture of an example cloud computing platform 1010 that can host a technical solution environment or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 1000 that includes cloud computing platform 1010, rack 1020, and node 1030 (for example, computing devices, processing units, or blades) in rack 1020. The technical solution environment can be implemented with cloud computing platform 1010, which runs cloud services across different data centers and geographic regions. Cloud computing platform 1010 can implement the fabric controller 1040 component for provisioning and managing resource allocation, deployment, upgrade, and management of cloud services. Typically, cloud computing platform 1010 acts to store data or run service applications in a distributed manner. Cloud computing platform 1010 in a data center can be configured to host and support operation of endpoints of a particular service application. In one example, the cloud computing platform 1010 is a public cloud, a private cloud, or a dedicated cloud.

Node 1030 can be provisioned with host 1050 (for example, operating system or runtime environment) running a defined software stack on node 1030. Node 1030 can also be configured to perform specialized functionality (for example, computer nodes or storage nodes) within cloud computing platform 1010. Node 1030 is allocated to run one or more portions of a service application of a tenant. A tenant can refer to a customer utilizing resources of cloud computing platform 1010. Service application components of cloud computing platform 1010 that support a particular tenant can be referred to as a multi-tenant infrastructure or tenancy. The terms “service application,” “application,” or “service” are used interchangeably with regards to FIG. 10, and broadly refer to any software, or portions of software, that run on top of, or access storage and computing device locations within, a datacenter.

When more than one separate service application is being supported by nodes 1030, certain nodes 1030 are partitioned into virtual machines (for example, virtual machine 1052 and virtual machine 1054). Physical machines can also concurrently run separate service applications. The virtual machines or physical machines can be configured as individualized computing environments that are supported by resources 1060 (for example, hardware resources and software resources) in cloud computing platform 1010. It is contemplated that resources can be configured for specific service applications. Further, each service application may be divided into functional portions such that each functional portion is able to run on a separate virtual machine. In cloud computing platform 1010, multiple servers may be used to run service applications and perform data storage operations in a cluster. In one embodiment, the servers perform data operations independently but exposed as a single device, referred to as a cluster. Each server in the cluster can be implemented as a node.

In some embodiments, client device 1080 is linked to a service application in cloud computing platform 1010. Example client device 1080 is any type of computing device, such as user device 102 or 230 described with reference to FIGS. 1 and 2, respectively, and the client device 1080 can be configured to issue commands to cloud computing platform 1010. In embodiments, client device 1080 communicates with service applications through a virtual Internet Protocol (IP) and load balancer or other means that direct communication requests to designated endpoints in cloud computing platform 1010. Certain components of cloud computing platform 1010 communicate with each other over a network (not shown), which includes, without limitation, one or more local area networks (LANs) and/or wide area networks (WANs).

Additional Structural and Functional Features of Embodiments of Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word “including” has the same broad meaning as the word “comprising,” and the word “accessing” comprises “receiving,” “referencing,” or “retrieving.” Furthermore, the word “communicating” has the same broad meaning as the word “receiving” or “transmitting” facilitated by software or hardware-based buses, receivers, or transmitters using communication media described herein. In addition, words such as “a” and “an,” unless otherwise indicated to the contrary, include the plural as well as the singular. Thus, for example, the constraint of “a feature” is satisfied where one or more features are present. Also, the term “or” includes the conjunctive, the disjunctive, and both (a or b thus includes either a or b, as well as a and b).

As used herein and in one example, the term “set” is employed to refer to an ordered (i.e., sequential) or an unordered (i.e., non-sequential) collection of objects (or elements), such as machines (for example, computer devices), physical and/or logical addresses, graph nodes, graph edges, functionalities, and the like. As used herein, a set may include N elements, where N is any positive integer. That is, a set may include 1, 2, 3, . . . . N objects and/or elements, where N is a positive integer with no upper bound. Therefore, as used herein, a set does not include a null set (i.e., an empty set), that includes no elements (for example, N=0 for the null set). A set may include only a single element. In other embodiments, a set may include a number of elements that is significantly greater than one, two, three, or billions of elements. A set may be an infinite set or a finite set. The objects included in some sets may be discrete objects (for example, the set of natural numbers N). The objects included in other sets may be continuous objects (for example, the set of real numbers R). In some embodiments, "a set of objects" that is not a null set of the objects may be interchangeably referred to as either "one or more objects" or "at least one object," where the term "object" may stand for any object or element that may be included in a set. Accordingly, the phrases "one or more objects" and "at least one object" may be employed interchangeably to refer to a set of objects that is not the null or empty set of objects. A set of objects that includes at least two of the objects may be referred to as "a plurality of objects."

As used herein and in one example, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjointed sets if the intersection between the two sets is the null set.

As used herein, the terms "application" or "app" may be employed interchangeably to refer to any software-based program, package, or product that is executable via one or more (physical or virtual) computing machines or devices. An application may be any set of software products that, when executed, provide an end user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

For purposes of a detailed discussion above, embodiments of the present disclosure are described with reference to a computing device or a distributed computing environment; however, the computing device and distributed computing environment depicted herein are non-limiting examples. Moreover, the terms computer system and computing system may be used interchangeably herein, such that a computer system is not limited to a single computing device, nor does a computing system require a plurality of computing devices. Rather, various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A system comprising:

at least one computer processor; and computer storage media storing computer-useable instructions that, when used by the at least one computer processor, cause the system to perform operations comprising:

receiving, from a user device, an input comprising a user query;

based on the input, determining a data set for responding to the user query;

determining, for the data set, a schema that characterizes an aspect of the data set;

based on the user query and the schema, generating for a Large Language Model (LLM) a first prompt comprising a first indication associated with the user query, a second indication associated with the schema, and an instruction directing the LLM to generate a set of computer instructions, comprising at least one instruction for processing the data in the data set responsive to the user query;

receiving a response to the first prompt from the LLM comprising the set of computer instructions; and based on the received set of computer instructions, generating an Application Programming Interface (API) call to:

access at least a portion of the data from the data set; and cause the portion of the data to be processed in accordance with the set of computer instructions.

2. The system of claim 1, wherein the aspect of the data set characterized by the schema comprises at least one of: metadata associated with the data set, an arrangement of the data in the data set, a data type of the data in the data set, or a new data type for new data that is not included in the data set and is determinable from at least a portion of the data in the data set.

3. The system of claim 1, wherein at least part of the schema is predetermined, or wherein the schema is determined based on at least a sample of the data in the data set, metadata associated with the data set, or an arrangement of the data in the data set.

4. The system of claim 1, wherein the data set comprises data arranged in a tabular format, graph, vector, list, index, catalog, or key-value pair, and wherein determining the schema comprises at least one of:

classifying at least a first dimension of the data set based on a semantic analysis of the data set to generate a classification;

determining a relationship between the first dimension and a second dimension of the data set; or determining a description of the classification of the first dimension and the relationship between the first dimension and the second dimension.

5. The system of claim 1, the operations further comprising:

based on the schema and the user query, generating a second prompt to the LLM comprising an indication associated with the schema and an instruction to determine a description of semantic data corresponding to at least the portion of the data in the data set;

receiving, from the LLM, the description of the semantic data; and updating the schema to include the description of the semantic data, wherein the description of the semantic data includes at least one of:

a first description for determining a new data from a first data in the data set, the new data related to the user query; or an indication of a data type for the first data in the data set, the data type related to the user query.

6. The system of claim 1, wherein the generated first prompt further comprises a third indication indicative of a category for a visual representation of the processed data, the category for the visual representation comprising at least one of: a graph, a chart, a table, or a diagram, and wherein the at least one computer instruction in the set of computer instructions specifies generating the visual representation.

7. The system of claim 1, wherein the operations further comprise:

communicating, to an endpoint of a productivity application and via an Application Programming Interface (API) of the productivity application, the API call, wherein communicating the API call causes the productivity application to generate visual content that is a visual representation of the processed portion of data.

8. The system of claim 1, wherein determining the data set comprises:

detecting an entity in the user query; and based on the detected entity, performing a search operation against stored data, wherein the data set is determined based on a result of the search operation.

9. The system of claim 1, wherein determining the data set comprises:

determining, from the input, an intent;

determining, from the intent or from the input, a task;

communicating a first indication of the intent or the task to the LLM as a first communication;

based on the first communication, receiving an initial response from the LLM to the first communication; and based on the initial response from the LLM not being near, in semantic vector space, to the intent or the task, communicating a second indication of the intent, the task, and the initial response until a subsequent response from the LLM is near the intent or the task in the semantic vector space, the semantic vector space being indicative of semantic similarity between one or more words or phrases.

10. The system of claim 1, wherein the operations further comprise:

providing an indication of the user query to the LLM and receiving at least one of: an indication of an intent associated with the user query or a task associated with the user query.

11. A computer-implemented method comprising:

receiving, from a user device, an input comprising a user query;

based on the input, determining data for responding to the user query;

determining, for the data, a schema that characterizes an aspect of the data;

based on the user query and the schema, generating for a Large Language Model (LLM) a first prompt comprising a first indication associated with the user query, a second indication associated with the schema, and an instruction directing the LLM to generate a set of computer instructions, comprising at least one instruction for processing the data responsive to the user query;

receiving a response to the first prompt from the LLM comprising the set of computer instructions; and based on a response to the first prompt and that comprises the set of computer instructions from the LLM, generating an Application Programming interface (API) call to:

access at least a portion of the data; and cause the portion of the data to be processed in accordance with the set of computer instructions.

12. The computer-implemented method of claim 11, wherein the input comprising the user query intended for the LLM from the user device is not communicated directly to the LLM.

13. The computer-implemented method of claim 11, wherein determining a data type related to the user query comprises:

identifying a plurality of data types related to the user query, wherein the plurality of data types have a first level of relatedness to the user query based on a semantic analysis; and performing an operation on the plurality of data types to generate a new data type, wherein the new data type has a second level of relatedness to the user query, wherein the second level of relatedness is higher than the first level of relatedness, wherein the data type comprises the new data type.

14. The computer-implemented method of claim 11, wherein the generated first prompt further comprises a third indication indicative of a category for a visual representation of the processed data, the category for the visual representation comprising at least one of: a graph, a chart, a table, or a diagram, and wherein the at least one computer instruction in the set of computer instructions specifies generating the visual representation.

15. The computer-implemented method of claim 11, further comprising transmitting, to an endpoint of a productivity application and via an API of the productivity application, the API call, wherein transmitting the API call causes the productivity application to generate visual content that is a visual representation of the processed portion of data.

16. The computer-implemented method of claim 11, wherein the data is arranged in a tabular format, graph, vector, list, index, catalog, or key-value pair, and wherein determining the schema comprises at least one of:

classifying at least a first dimension of the data based on a semantic analysis of the data to generate a classification;

determining a relationship between the first dimension and a second dimension of the data; or determining a description of the classification of the first dimension and the relationship between the first dimension and the second dimension.

17. One or more computer storage media having computer-executable instructions embodied thereon that, when executed, by at least one processors, cause the at least one processor to perform operations comprising:

receiving, from a user device, an input comprising a user query for processing data to respond to the user query;

based on the input, determining data for responding to the user query;

determining a schema that characterizes an aspect of the data;

based on the user query and the schema, generating for a Large Language Model (LLM) a first prompt comprising a first indication associated with the user query, a second indication associated with the schema, and an instruction directing the LLM to generate a set of computer instructions, comprising at least one instruction for processing the data responsive to the user query;

based on the set of computer instructions from the LLM, generating an Application Programming Interface (API) call to:

access at least a portion of the data from the data; and cause the portion of the data to be processed in accordance with the set of computer instructions.

18. The computer storage media of claim 17, wherein the operations further comprise:

providing the first prompt to the LLM; and receiving, from the LLM and in response to the first prompt, a response based on the set of computer instructions.

19. The computer storage media of claim 17, wherein determining the schema comprises at least one of:

classifying at least a first dimension of the data based on a semantic analysis of the data to generate a classification;

determining a relationship between the first dimension and a second dimension of the data; or determining a description of the classification of the first dimension and the relationship between the first dimension and the second dimension.

20. The computer storage media of claim 17, the operations further comprising:

based on the schema and the user query, generating a second prompt to the LLM comprising an indication associated with the schema and an instruction to determine a description of semantic data corresponding to at least the portion of the data;

receiving, from the LLM, the description of the semantic data; and updating the schema to include the description of the semantic data, wherein the description of the semantic data includes at least one of:

a first description for determining a new data from a first data in the data, the new data related to the user query; or an indication of a data type for the first data in the data, the data type related to the user query.

* * * * *